US005698013A

United States Patent [19]

Chao

[11] Patent Number: 5,698,013
[45] Date of Patent: Dec. 16, 1997

[54] NITROGEN-SELECTIVE ZEOLITIC ADSORBENT FOR USE IN AIR SEPARATION PROCESS

[75] Inventor: Chien C. Chao, Millwood, N.Y.

[73] Assignee: UOP, Des Plaines, Ill.

[21] Appl. No.: 704,051

[22] Filed: Aug. 28, 1996

Related U.S. Application Data

[63] Continuation-in-part of Ser. No. 521,699, Aug. 31, 1995, abandoned, which is a continuation-in-part of Ser. No. 210,391, Mar. 18, 1994, Pat. No. 5,454,857.

[51] Int. Cl.$^6$ ................................................. B01D 53/047
[52] U.S. Cl. ................................ 96/108; 96/153; 502/79
[58] Field of Search .......................... 95/95–106, 130, 95/902; 502/79; 96/108, 153

[56] References Cited

U.S. PATENT DOCUMENTS

| | | | |
|---|---|---|---|
| 3,140,931 | 7/1964 | McRobbie | 95/130 |
| 3,140,932 | 7/1964 | McKee | 95/130 |
| 3,140,933 | 7/1964 | McKee | 95/130 X |
| 3,237,377 | 3/1966 | Skarstrom | 95/130 X |
| 4,477,267 | 10/1984 | Reiss | 95/902 X |
| 4,481,018 | 11/1984 | Coe et al. | 95/130 |
| 4,557,736 | 12/1985 | Sircar et al. | 95/130 X |
| 4,859,217 | 8/1989 | Chao | 95/130 |
| 4,943,304 | 7/1990 | Coe et al. | 95/130 |
| 4,964,889 | 10/1990 | Chao | 95/130 X |
| 5,114,440 | 5/1992 | Reiss | 95/130 X |
| 5,174,979 | 12/1992 | Chao et al. | 423/715 |
| 5,258,060 | 11/1993 | Gaffney | 95/130 X |
| 5,266,102 | 11/1993 | Gaffney | 95/130 X |
| 5,300,138 | 4/1994 | Fischer et al. | 95/125 |
| 5,441,557 | 8/1995 | Mullhaupt et al. | 95/130 X |
| 5,454,857 | 10/1995 | Chao | 95/96 |
| 5,531,808 | 7/1996 | Ojo et al. | 95/902 X |

FOREIGN PATENT DOCUMENTS

| | | |
|---|---|---|
| 0122874 | 10/1984 | European Pat. Off. ........ 95/130 |
| 196103A | 10/1986 | European Pat. Off. . |
| 325906A | 8/1989 | European Pat. Off. . |
| 40-026246 | 11/1965 | Japan ........ 95/130 |
| 52-053787 | 4/1977 | Japan ........ 95/130 |
| 60-127202 | 7/1985 | Japan ........ 95/130 |
| 60-231402 | 10/1985 | Japan ........ 95/130 |
| 61-153138A | 7/1986 | Japan . |
| 01138106A | 5/1989 | Japan . |
| 1580928 | 6/1977 | United Kingdom . |

*Primary Examiner*—Robert Spitzer
*Attorney, Agent, or Firm*—Thomas K. McBride; John G. Tolomei; Richard P. Silverman

[57] ABSTRACT

In using calcium-exchanged forms of zeolite X as selective adsorbents for nitrogen in PSA air separation process, it has been discovered that, particularly under certain temperature and pressure conditions, superior performance is not, as is generally believed, obtained when the calcium content is at a maximum, but rather when the degree of calcium exchange is in the range of 60 to 89 equivalent percent and only when the framework Si/Al$_2$ ratio of the zeolite is within the range of 2.0 to 2.4

2 Claims, 15 Drawing Sheets

5,698,013

NITROGEN-SELECTIVE ZEOLITIC ADSORBENT FOR USE IN AIR SEPARATION PROCESS

CROSS-REFERENCE TO RELATED APPLICATION

This application is a continuation-in-part application of U.S. application Ser. No. 08/521,699, filed Aug. 31, 1995, now abandoned, which is a continuation-in part application of U.S. application Ser. No. 08/210,391, filed Mar. 18, 1994 and issued as U.S. Pat. No. 5,454,857 on Oct. 3, 1995.

FIELD OF THE INVENTION

The present invention relates in general to use of a novel zeolitic adsorbent in air separation processes to selectively adsorb nitrogen and, more particularly, to the use in such processes of a nitrogen-selective adsorbent containing zeolite X having a framework Si/$Al_2$ ratio of 2.0 to 2.4 and having a cation population at available cation exchange sites comprising from 60 to 89 equivalent percent $Ca^{++}$ ions, from 10 to 40 equivalent percent $Na^+$ ions, and from about 0.1 to about 10 equivalent percent $K^+$ ions and wherein the total cation equivalency contributed by $Ca^{++}$, $Na^+$, and $K^+$ cations is at least 90 percent.

BACKGROUND OF THE INVENTION

The separation of air into its two principal constituents, nitrogen and oxygen, is an important commercial operation which produces several hundred billion cubic feet of each material every year. Where large quantities of either constituent are required as—for example— oxygen in the manufacture of steel, the large capital costs of cryogenic systems can be justified, and cryogenic procedures are generally employed. For operations with smaller requirements, oxygen and nitrogen can also be produced by pressure swing adsorption (PSA) processes. In PSA processes, compressed air is pumped through a fixed bed of an adsorbent exhibiting an adsorptive preference for one of the main constituents whereby an effluent product stream enhanced in the non-adsorbed (or lesser adsorbed) constituent is obtained. Compared to the cryogenic processes, PSA air separation processes require relatively simple equipment and are relatively easy to maintain. PSA processes, however, have lower product recovery and higher energy consumption than the cryogenic processes. For these reasons, improvements in the adsorption processes remain an important goal. One principal means of improvement is the discovery and development of better adsorbents.

The use of crystalline zeolitic molecular sieves as selective adsorbents for nitrogen, particularly from air, is well known in the art. The general class of zeolites having pore diameters of at least 4.6 Angstroms was proposed in U.S. Pat. No. 3,140,931 for this service. The use of the particular zeolite species, zeolite X, containing as cations at least one member of the group consisting of strontium, barium, or nickel was proposed for this separation in U.S. Pat. No. 3,140,932. The relative merits of the various alkali metal cation forms of zeolites, including zeolite X, were discussed in U.S. Pat. No. 3,140,933. In U.S. Pat. No. 4,557,736, a binary ion-exchanged form of zeolite X was taught as a preferred adsorbent for the adsorption of nitrogen from air. In U.S. Pat. No. 4,481,018, a set of activation conditions which substantially avoids both frame work and cation hydrolysis in polyvalent cation forms of faujasite is disclosed. These compositions, particularly in the $Mg^{++}$, $Ca^{++}$, $Sr^{++}$, and/or $Ba^{++}$ cation forms, are alleged to be superior adsorbents for the separation of nitrogen from air. U.S. Pat. No. 4,481,018 relates to calcium exchanged forms of zeolite X and based on selectivity values for $N_2/O_2$ obtained from gas chromatographic studies, this 1018 patent teaches that the higher the degree of $Ca^{++}$ exchange the greater the selectivity and capacity of the faujasite-type adsorbent for the separation of nitrogen from air. The minimum calcium content disclosed is 50% and the preferred adsorbents contain greater than 80 equivalent percent calcium cations. In sum, calcium, strontium, and lithium cations are viewed by the prior art as desirable constituents of zeolitic adsorbents for use in nitrogen separation. Other cations such as sodium are viewed as less desirable.

SUMMARY OF THE INVENTION

Surprisingly, it has now been found that zeolite X—particularly those forms having a Si/$Al_2$ framework molar ratio of from 2.0 to 2.4, which contain a charge-balancing cation population comprising from 60 to 89, preferably 60 to 80, equivalent percent $Ca^{++}$ cations, from 10 to 40 equivalent percent $Na^+$ cations, and from about 0.1 to about 10 equivalent percent $K^+$ cations, and wherein the total cation equivalency contributed by $Ca^{++}$, $Na^+$, and $K^+$ is at least 90 percent—is significantly more effective as an adsorbent for the separation of air in a pressure-swing adsorption process in the temperature range of 50° to −20° C. at pressures in the range of 5 to 506.5 kPa (0.05 to 5.0 atmospheres) than is the same zeolite X that has been calcium exchanged to a greater or a lesser extent.

Accordingly, the present invention resides in a cyclic process for separating nitrogen from a mixture thereof with oxygen which comprises (a) providing an adsorption bed containing as an adsorbent a zeolite having the crystal structure of faujasite, a framework $SiO_2/Al_2O_3$ molar ratio of from 2.0 to 2.4 and containing from 60 to 89 equivalent percent $Ca^{++}$ cations, from 10 to 40 equivalent percent $Na^+$ cations, and from about 0.1 to about 10 equivalent percent $K^+$ cations and the total cation equivalency contributed by $Ca^{++}$, $Na^+$, and $K^+$ being at least 90 percent; (b) passing said mixture of nitrogen and oxygen into said adsorption bed at a temperature of from −20° C. to 50° C. until an internal bed pressure rises to the range of 13.8 to 506.8 kPa (2 to 73.5 psia) and nitrogen is selectively adsorbed on said zeolite adsorbent; (c) discharging unadsorbed oxygen as a product from the adsorption bed at the adsorption pressure and (d) decreasing the bed pressure to a final desorption pressure within the range of 101.4 to 0.7 kPa (14.7 to 0.1 psia) to desorb the adsorbed nitrogen and discharge desorbed nitrogen from the bed.

Preferably, in the zeolite X adsorbent of the present invention, the zeolite X adsorbent has a $SiO_2/Al_2O_3$ molar ratio of from 2.0 to 2.35 and a cation population comprising from 65 to 80% calcium and 20 to 35% sodium cations, and about 0.1 to about 10 equivalent $K^+$ cations. More preferably, the zeolite X adsorbent of the present invention comprises a potassium cations population ranging from about 0.1 about 1 equivalent percent potassium cations. More preferably, the potassium cation population will comprise from about 0.1 to about 10 equivalent $K^+$ cations.

DETAILED DESCRIPTION

Figure 1:
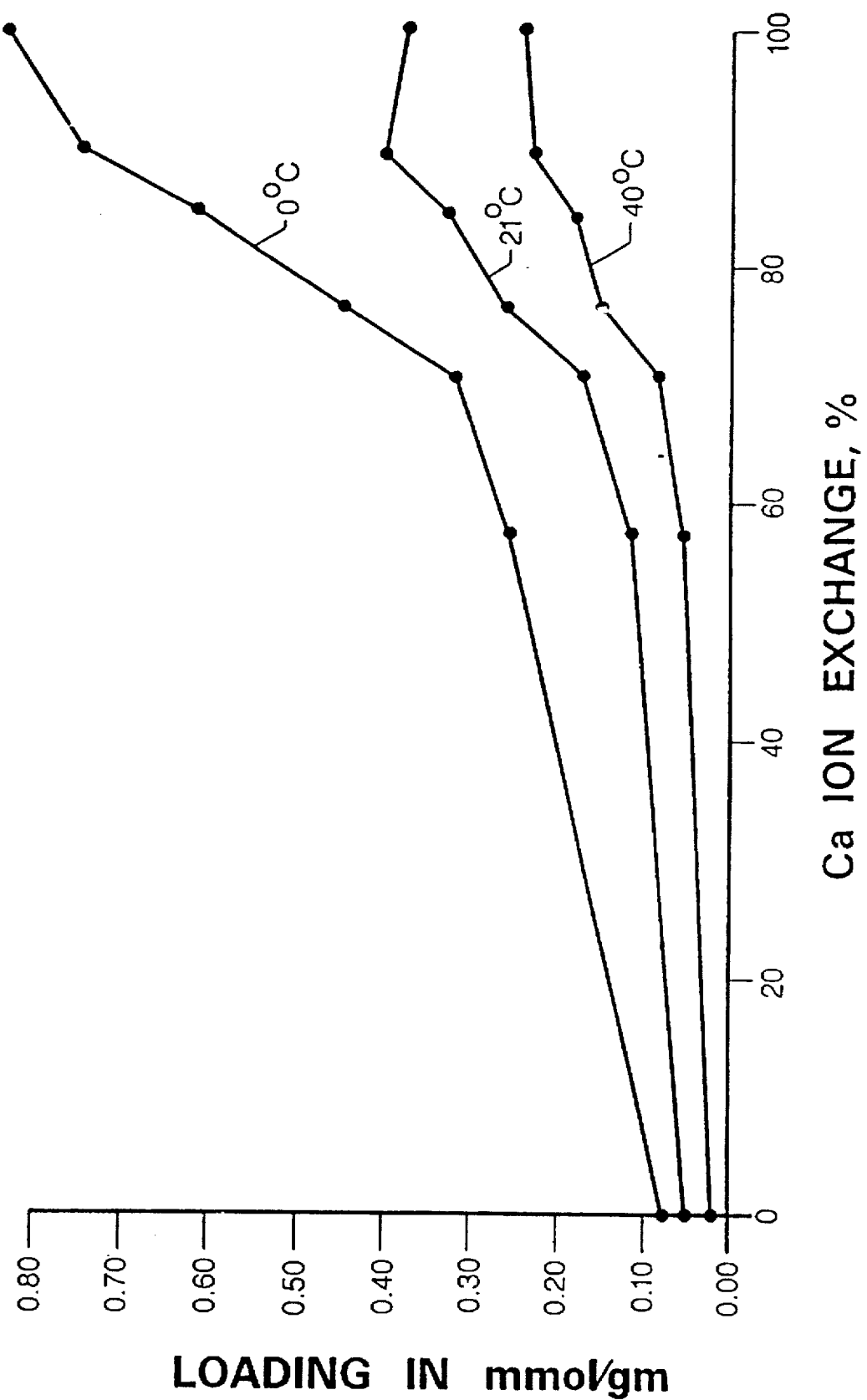
FIG. 1 plots nitrogen residual loadings of CaNaX2.0 (i.e. X zeolite having a silica/alumina ratio of 2:1 and $Ca^{++}$ and $Na^+$ cations) after desorption to 10.7 kPa (1.55 psia) as a function of calcium exchange level at 40° C., 20° C., and 0° C., respectively.

It is well known that nitrogen has a quadrupole moment of 0.31 $A^3$ and, for that reason, interacts more strongly with zeolitic cations than does oxygen which has a quadrupole moment of only about 0.10 $A^3$. Being more strongly adsorbed, nitrogen is selectively adsorbed on zeolites from mixtures of nitrogen and oxygen in accordance with thermodynamic principles. This selectivity for nitrogen adsorption is the basis for the numerous air separation processes utilizing fixed-bed pressure-swing adsorption-desorption cycles. The properties of the zeolite cations are the most important factors which bear on the selectivity and capacity for nitrogen adsorption. Lithium and calcium as zeolitic cations have been shown to exhibit particularly strong affinities for nitrogen.

In the case of calcium-exchanged forms of zeolite X, the effect of increasing calcium content has been reported in U.S. Pat. No. 4,481,018. Therein it is alleged that better selectivity and capacity is achieved when the calcium cation content exceeds about 80 equivalent percent. The improvement in nitrogen adsorption efficacy is ascribed to the fact that the calcium and other polyvalent metal cations of the zeolite X employed are predominantly in the dehydrated/dehydroxylated state. In view of these teachings, it is the general understanding by those skilled in the art that where a particular metal cation form of zeolite exhibits good adsorptive properties with respect to nitrogen, the higher the content of that particular metal cation the better the performance in air separation.

It has now unexpectedly been found that in the case of calcium-exchanged forms of zeolite X, the peak performance in air separation under certain temperature and pressure conditions is not obtained when the calcium content is at a maximum, but rather when the degree of calcium exchange is in the range of 60 to 89 equivalent percent, especially in the range of 65 to 80 equivalent percent. It is even more surprising to find that the improvement caused by the reduced calcium exchange level results in an effective adsorbent only if the $SiO_2/Al_2O_3$ ratio of X zeolite is in the range of 2.0 to 2.4.

While not wanting to be bound by any particular theory or theories, it is believed that too much reliance has heretofore been placed on the charge density of the calcium cation without due regard for other factors. At least with respect to calcium-exchanged forms of zeolite X, hereinafter designated CaNaX, the nitrogen selectivity and capacity are complex functions of cation composition and zeolite structure as well as the temperature and pressure conditions under which the adsorbent and the nitrogen-containing gas are brought into contact.

The nitrogen selectivities of CaNaX compositions reported in the literature are often measured with chromatographic techniques, with the nitrogen pressure over the adsorbent being quite low. Since the nitrogen selectivity of CaNaX is sensitive to pressure, the high selectivity values reported are not applicable to higher nitrogen pressures. The present invention is based at least in part upon the discovery that, depending upon the level of calcium exchange, the nitrogen selectivity of CaNaX can drop significantly as pressure increases. Furthermore, pressure used in the adsorption step of a practical commercial scale air separation process is substantially higher than the nitrogen pressure in a chromatographic measurement. Therefore, the selectivity as determined by chromatographic method has very little relevancy to the adsorption step in a commercial pressure swing adsorption process.

In a PSA air-separation process, desorption is a required process step. For an efficient adsorbent, a maximum decrease of nitrogen loading over the shortest desorption time interval must be achieved so that the adsorbent can be regenerated with minimal use of a vacuum pump or the oxygen product. In other words, in order to have an efficient desorption step in a PSA air separation process, it is necessary for the adsorbent to have a low nitrogen affinity at the desorption or purge pressure. Since the nitrogen pressure in a chromatographic measurement is well within the desorption pressure of a PSA process, a high nitrogen selectivity observed chromatographically suggests that such an adsorbent will have poor desorption characteristics in a PSA process.

Ideally, for PSA air separation, an adsorbent should exhibit a low nitrogen affinity at low pressures and a high nitrogen affinity at high pressures. In theory, and confirmed by actual experience, it is not possible to have such a nitrogen adsorbent. The next best thing is an adsorbent whose nitrogen selectivity does not decline steeply as the adsorbate pressure increases.

In accordance with the present invention it has been found that for CaNaX adsorbents, the decrease in nitrogen affinity with increasing nitrogen pressure is, to a significant degree, dependent upon the level of calcium ion exchange. For highly calcium X, i.e., 90 equivalent percent or greater, the decrease in nitrogen affinity is steep. For CaNaX having a 60 to 89% $Ca^{++}$ level, the affinity for nitrogen at very low pressures is not very high and it does not decrease rapidly when pressure increases. As a result, the operational nitrogen selectivity of moderately calcium exchanged CaNaX can be higher than that of high CaX. More importantly, at the desorption pressure the nitrogen is easily desorbed from the moderately exchanged CaNaX, thus significantly facilitating the regeneration of the adsorbent. As a result the overall performance of the particular CaNaX compositions employed in this invention is significantly better than that of the more highly exchanged CaX. Similarly, the addition of potassium cation to the moderately exchanged CaNaX produced similar nitrogen performance when potassium was present in the range of about 0.1 to about 10 equivalent percent potassium.

To evaluate the potential of a material as a PSA air separation adsorbent, the following three criteria should be considered: 1. Residual nitrogen loading which is the nitrogen loading at the desorption pressure. A good PSA air adsorbent should have low residual nitrogen loading. 2. The nitrogen delta loading which is the difference between the loading at adsorption pressure and the loading at the desorption pressure. A good PSA air adsorbent should have a high nitrogen delta loading. 3. The operational selectivity which is defined as the nitrogen delta loading divided by the oxygen delta loading. A good air separation adsorbent should have a high operational selectivity for nitrogen.

The temperature at which the process is to be carried out is also an important factor in the performance of adsorbents in air separations. Industrial PSA air separation vessels are usually large and process cycle times are short relative to the time needed to heat up or cool down the massive amount of adsorbent involved. As a consequence, the process cycle is carried out under adiabatic or near adiabatic conditions. The heat of adsorption of nitrogen on CaNaX zeolites is significant. The heat released by adsorption is carried forward by the feed and product gas and accumulates to form a heat front. A portion of the heat front may leave the column with the product gas. The remaining portion of the front is pushed back into the column during the desorption stage of the process cycle. During the desorption, kinetic energy is consumed to free nitrogen from the adsorbent and thus reduces the temperature of nitrogen and the adsorbent. The heat of desorption creates a cold front in the bed; portion of which leaves the bed along with the waste gases. During the next adsorption step, the remaining portion of the cold front is pushed backward through the column by the feed gas.

After many adsorption-desorption cycles a steady state will be reached. At the steady state, some portion of the bed can be significantly cooler than ambient. It is, therefore, imperative to utilize an adsorbent whose adsorptive properties are not unduly impaired by such temperature changes. The present invention is based in part upon the determination that the adsorptive properties of highly calcium exchanged forms of zeolite X are easily impaired by a drop in temperature but, in the case of the moderately exchanged CaNaX, are not so impaired. Even a moderate decrease of adsorption temperature can greatly increase the residual nitrogen loading and decrease the nitrogen operational selectivity of a highly calcium exchanged X zeolite. Our investigations also establish that adiabatic desorption will cause a greater temperature drop on high CaX than on CaNaX or CaNaKX.

In a PSA air separation process, the productivity of adsorbent is determined not only by the nitrogen delta loading and the nitrogen operational selectivity but also by length of cycle time. An adsorbent which can function in a shorter cycle time will have a higher production rate. The cycle time is determined by how rapidly the adsorbent can be regenerated and made ready for the next adsorption step. It has been found that nitrogen desorbs much faster from a moderately exchanged CaNaX than from a highly exchanged CaX.

In sum, after taking PSA air separation conditions into consideration, it has been found that moderately calcium exchanged CaNaX is a superior adsorbent to highly exchanged CaX. The CaNaKX adsorbent performance is similar in overall trends to the CaNaX results.

The present invention is illustrated and exemplified by the data shown in tabular form in TABLES I through VII and in the graphs of FIGS. 1 through 15 of the drawings. The following adsorbent compositions, the methods for their preparation, and the testing procedures were utilized in obtaining the aforesaid data:

Preparation of the Starting Zeolite X-Compositions

Samples of Zeolite X having $Si/Al_2$ molar ratios of 2.0, 2.3, and 2.5, respectively, were prepared. The sample having a $Si/Al_2$ ratio of 2.0 was synthesized hydrothermally at 70° C. in the mixed $Na^+$- $K^+$ cation form, i.e., NaKX2.0, in accordance with the technique disclosed in British Patent 1,580,928, using sodium hydroxide, potassium hydroxide, sodium silicate, aluminum hydroxide and water as the reagents. As initially crystallized, the NaKX2.0 contained about 25 equivalent percent $K^+$ cations with the remainder being $Na^+$ cations. The $K^+$ cations were substantially all removed and replaced by $Na^+$ cations by a thorough ion exchange using an aqueous NaCl solution. In Examples 7 and 8, the K+ cations were washed to a lesser extent with the NaCl solution to produce the desired levels of the CaNaX adsorbent.

Certain of the test procedures reported hereafter were performed on pure, i.e., unbonded, zeolite samples, and in others bonded agglomerates were utilized. In the latter case, the binding agent was an attapulgite-type clay available from the Floridin Company under the trademark Minugel. The agglomerates, in the form of beads and extruded pellets, were prepared by conventional methods well known in the art.

To prepare partially calcium exchanged adsorbents, a batch exchange technique was used. The zeolite, either in powder or aggregate form, was immersed in a calcium chloride solution at 80° to 95° C. with constant agitation. Typically this operation lasted 1 to 2 hours. The calcium exchange level was controlled by the quantity of zeolite and calcium chloride used. To prepare high calcium exchanged zeolite X powder, a technique of repeated batch exchange with great excess of calcium chloride was used. To prepare high calcium exchanged aggregates, a column exchange technique was used. Zeolite aggregates were placed in a heated column and preheated calcium chloride solution was passed through the column to displace and flush away the exchanged sodium or potassium ions. Further details of the ion-exchange procedures appear in the numbered Examples, below.

Example 1

In this Example are reported the preparation, composition, and adsorption properties of those CaNaX compositions in which the $Si/Al_2$ framework ratio is 2.0. These compositions are denominated CaNaX2.0. The CaNaX2.0 samples were prepared by batch ion-exchanging NaX2.0 clay-bonded agglomerates in the form of 8×12 beads. In general, 50 grams of starting NaX2.0 beads (dry weight) were added to 1 to 2 liters of aqueous 0.15M to 1M $CaCl_2$ solution adjusted to a pH of 9.0 using Ca $(OH)_2$. In each instance the exact quantity and concentration of the $CaCl_2$ solution were selected in view of the targeted degree of $Ca^{++}$ ion-exchange to be achieved. Where necessary, multiple batch exchange procedures were used to obtain a product of the desired degree of ion-exchange. In each batch exchange the zeolite-containing beads were stirred in the $CaCl_2$ solution while the solution was heated from ambient room temperature up to 90° C. and thereafter the stirring continued for one hour. The exchanged beads were recovered by filtration in a Buchner funnel and rinsed with 500 ml of hot water at a pH of 9.0 adjusted by the addition of $Ca(OH)_2$. Thereafter the beads were stirred in 1 liter of water at 90° C. and a $Ca(OH)_2$-adjusted pH of 9.0 for 30 minutes, recovered by filtration and dried in air. In all, seven CaNaX2.0 samples, denominated hereinafter as 1a through 1 g, respectively, were prepared. The particulars of the preparation and the chemical composition of the products are set forth in Table I and Table II, respectively. All of the agglomerate beads contained 12 wt. % clay binder.

Example 2

Six powder and two beaded samples of calcium-exchanged NaX having a $Si/Al_2$ molar ratio of 2.3 were prepared by the same general procedures described in Example 1. The principal difference in the procedures was the temperature of the ion-exchange medium which was 95° C. in these preparations instead of the 90° C. temperature used in Example 1. The details of the ion-exchange procedures and the chemical composition of the ion-exchanged products, denominated as samples 2a through 2h, are set forth below in Table I and Table II, respectively.

Example 3

Using an as-synthesized sodium zeolite X having a $Si/Al_2$ molar ratio of 2.5, clay-bonded 8×12 beads were ion-exchanged with $Ca^{++}$ ions. Four samples, denominated 3a through 3d, respectively, were prepared. Samples 3a and 3b were ion exchanged using the batch technique of Examples 1 and 2, and samples 3c and 3d were ion-exchanged using the column technique wherein an aqueous $CaCl_2$ solution is passed through a heated column containing the zeolite-containing beads. Details of the ion-exchange procedures and the chemical compositions of the exchanged products are set forth in Table I and Table II, respectively.

Example 4

The nitrogen and oxygen isotherms of activated samples 1a through 1g and the NaX2.0 starting material of Example 1 were determined at 40° C., 20° C., 0° C. and –20° C. Sartorius balance. The samples were activated in a glass tube in a system equipped with an oil diffusion pump and a liquid nitrogen trap by heating from ambient room temperature up to 510° C. over the period of 10 hours and maintaining the final temperature for 6 hours. A pressure of $1.33\times10^{-6}$ kPa ($1\times10^{-5}$ torr) was achieved at the end of the activation procedure. In the measurement of the nitrogen and oxygen isotherms the temperature of each test sample was controlled by placing the sample chamber in a constant temperature bath or a tube furnace, as appropriate. Between 0 to 506.7 kPa (zero psia to 73.5 psia), 13 data points were taken. The nitrogen loadings at exactly 10.7 to 101.4 kPa (1.55 and 14.7 psia) were determined by interpolation. The difference of the two values is the nitrogen delta loading. The oxygen loadings at 25.5 kPa (3.7 psia) were also determined by interpolation. The nitrogen delta loading divided by the oxygen delta loading between 25.5 kPa (3.7 psia) and 0 kPa (zero psia) gives what is termed the operational selectivity. Values of residual loading, delta loading, and operational selectivity are listed in Table III below, and plotted in FIGS. 1, 2, and 3 of the drawings.

Example 5

Figure 4:
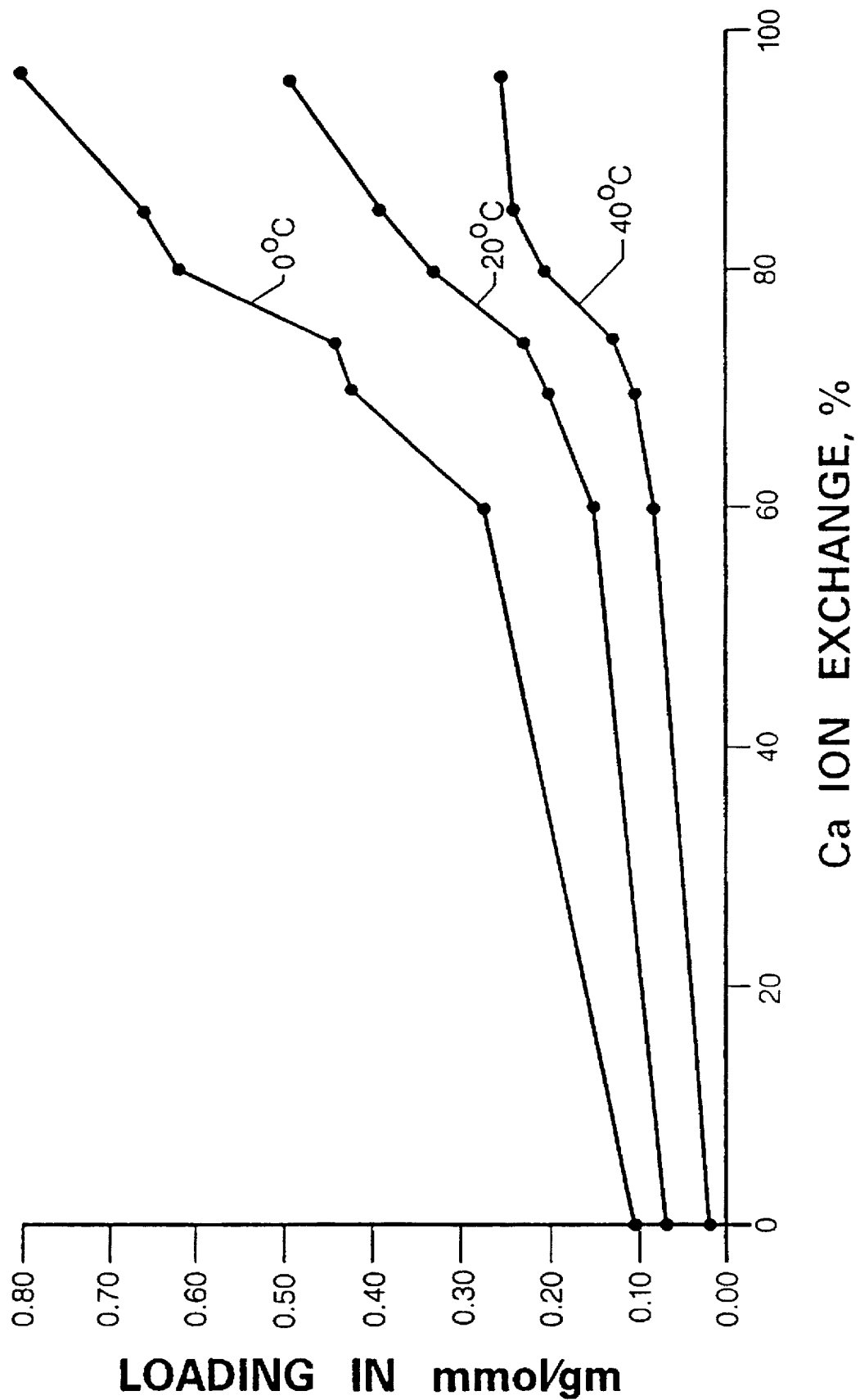
FIGS. 4, 5, and 6 plot nitrogen residual loading, delta loading, and operational selectivity of CaNaX2.3 as a function of calcium exchange level at 40° C., 20° C., and 0° C., respectively.
Figure 5:
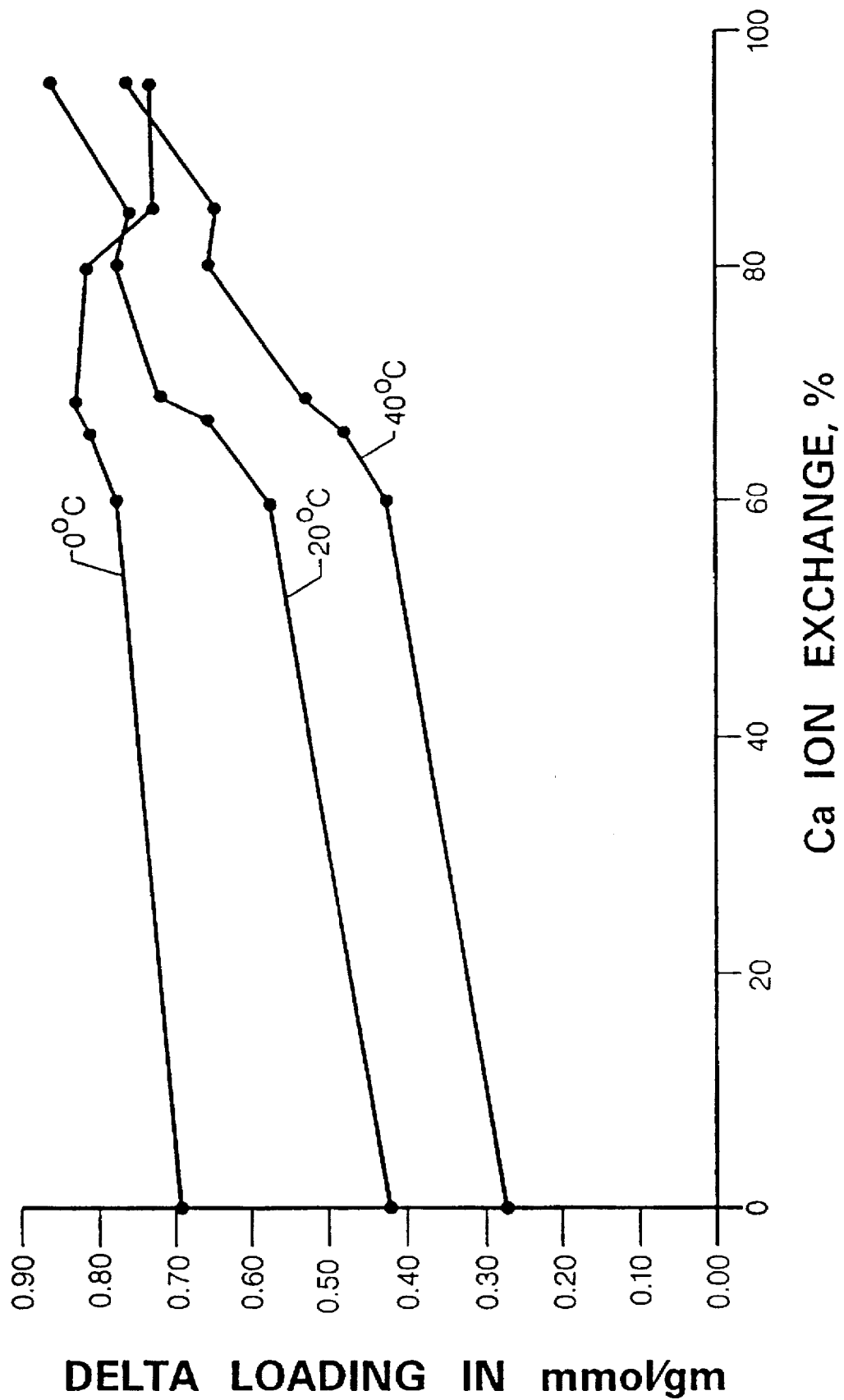
Figure 6:
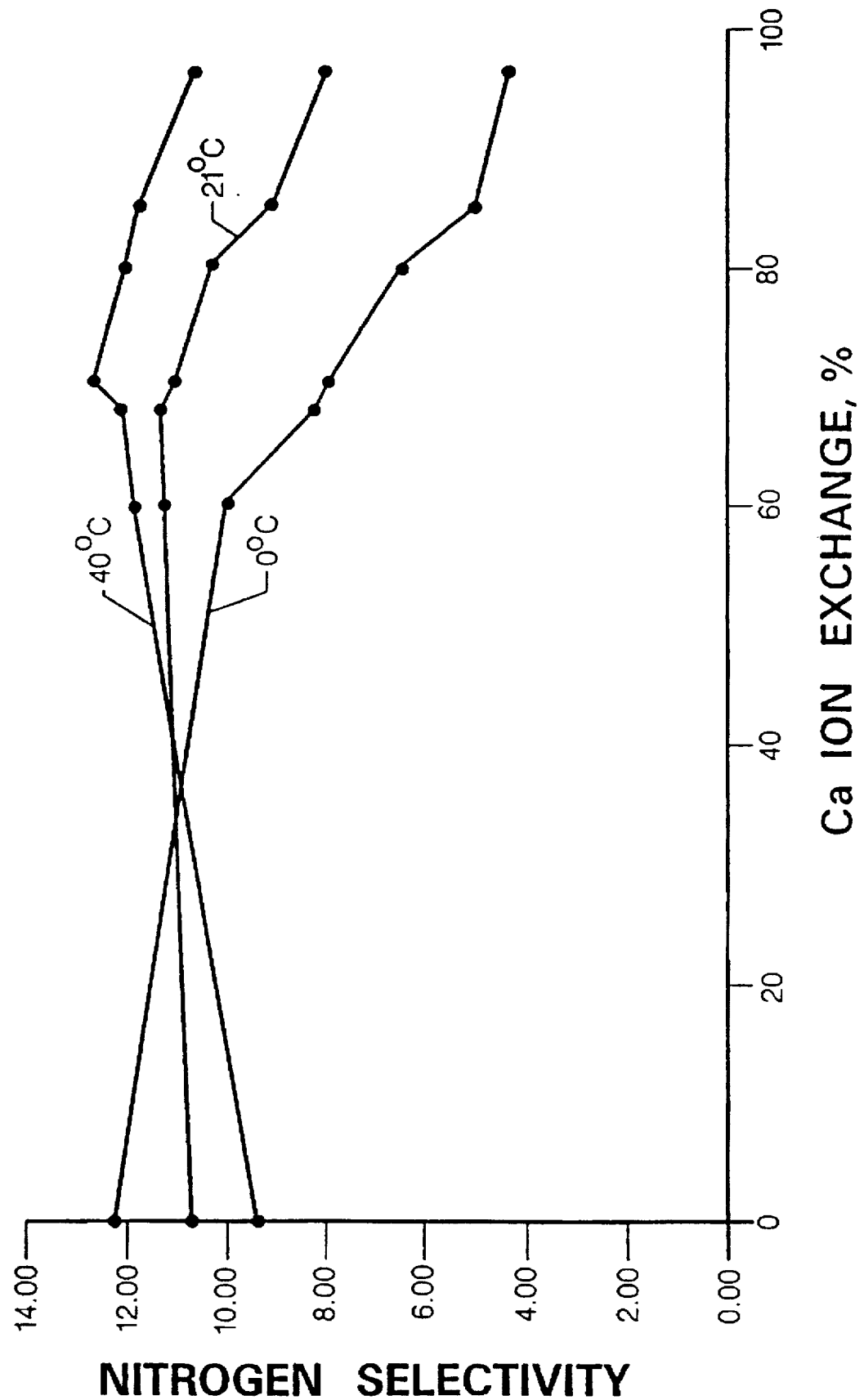

Following the procedure described in Example 4, supra, the nitrogen residual loading, nitrogen delta loading, and the nitrogen operation selectivity of NaX2.3 and CaNaX2.3 samples of 2a through 2h, respectively, of Example 2 were determined. The results are tabulated in Table IV. All of these samples are unbonded, i.e., they do not contain clay, zeolite powder. FIGS. 4, 5 and 6 of the drawings disclose residual loadings and operational selectivity data as functions of calcium exchange levels and adsorption temperatures.

Example 6

Figure 7:
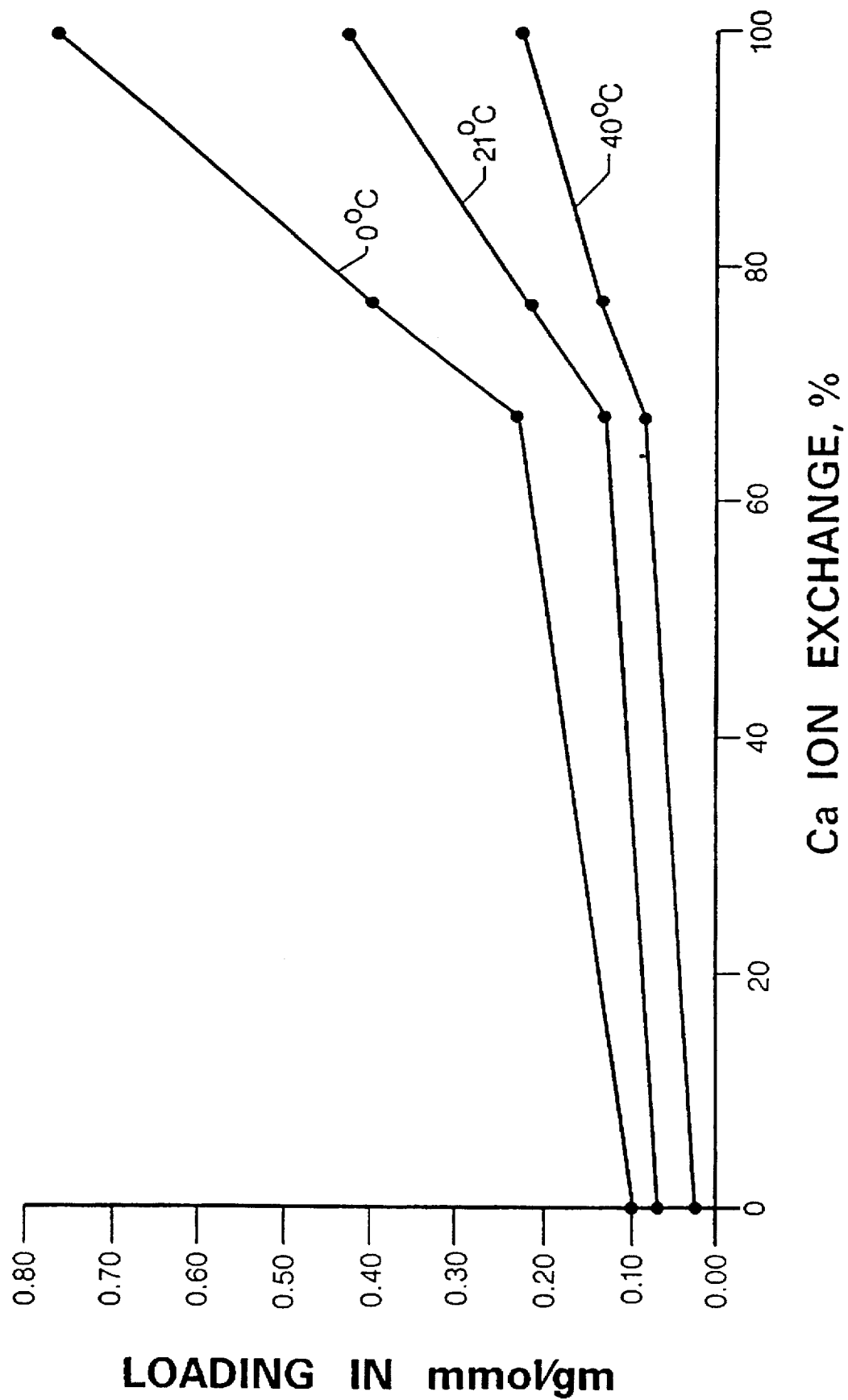
FIGS. 7, 8, and 9 plot nitrogen residual loading, delta loading, and operational selectivity of CaNaX2.5 as a function of calcium exchange level at 40° C., 20° C., and 0°, respectively.
Figure 8:
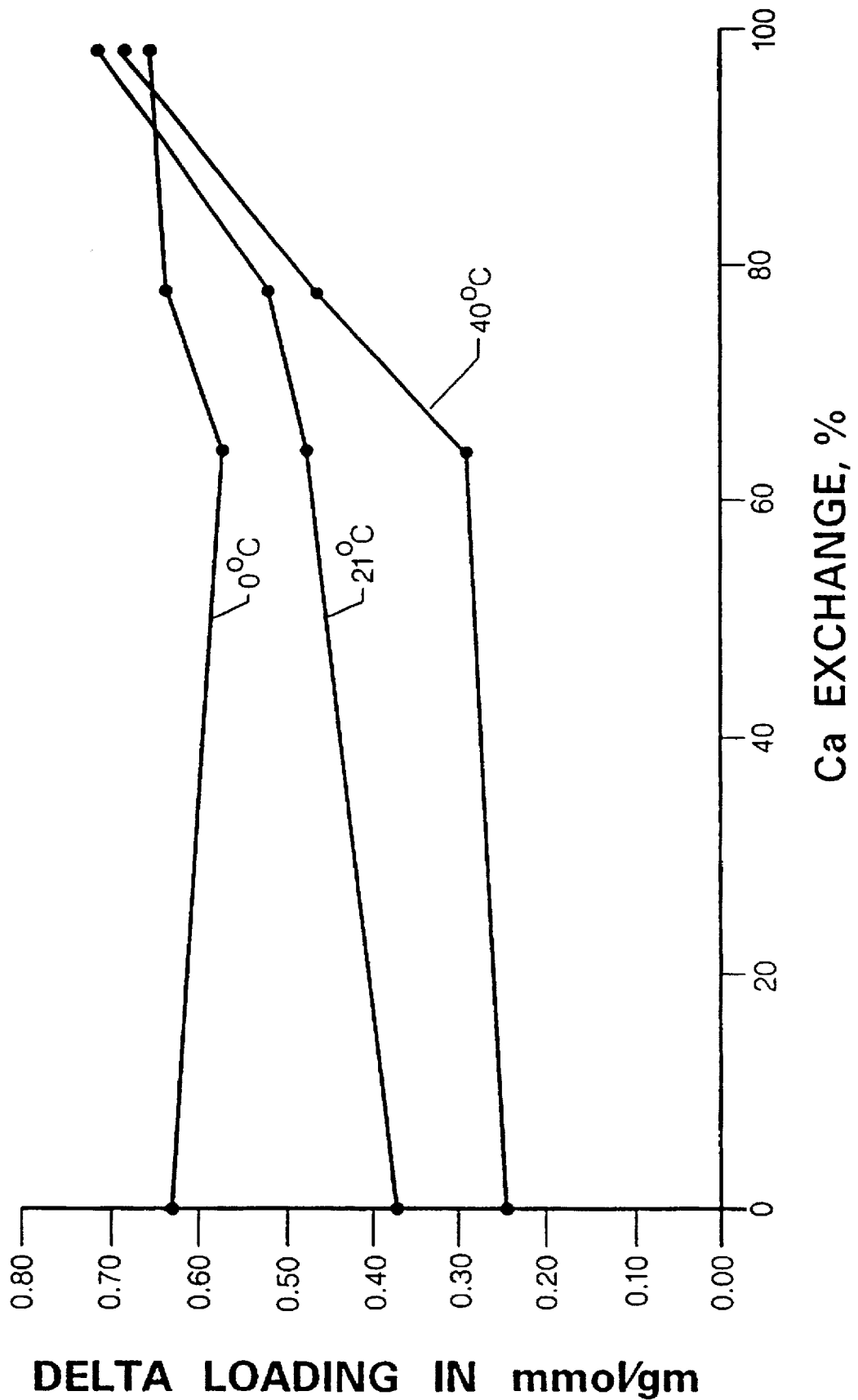
Figure 9:
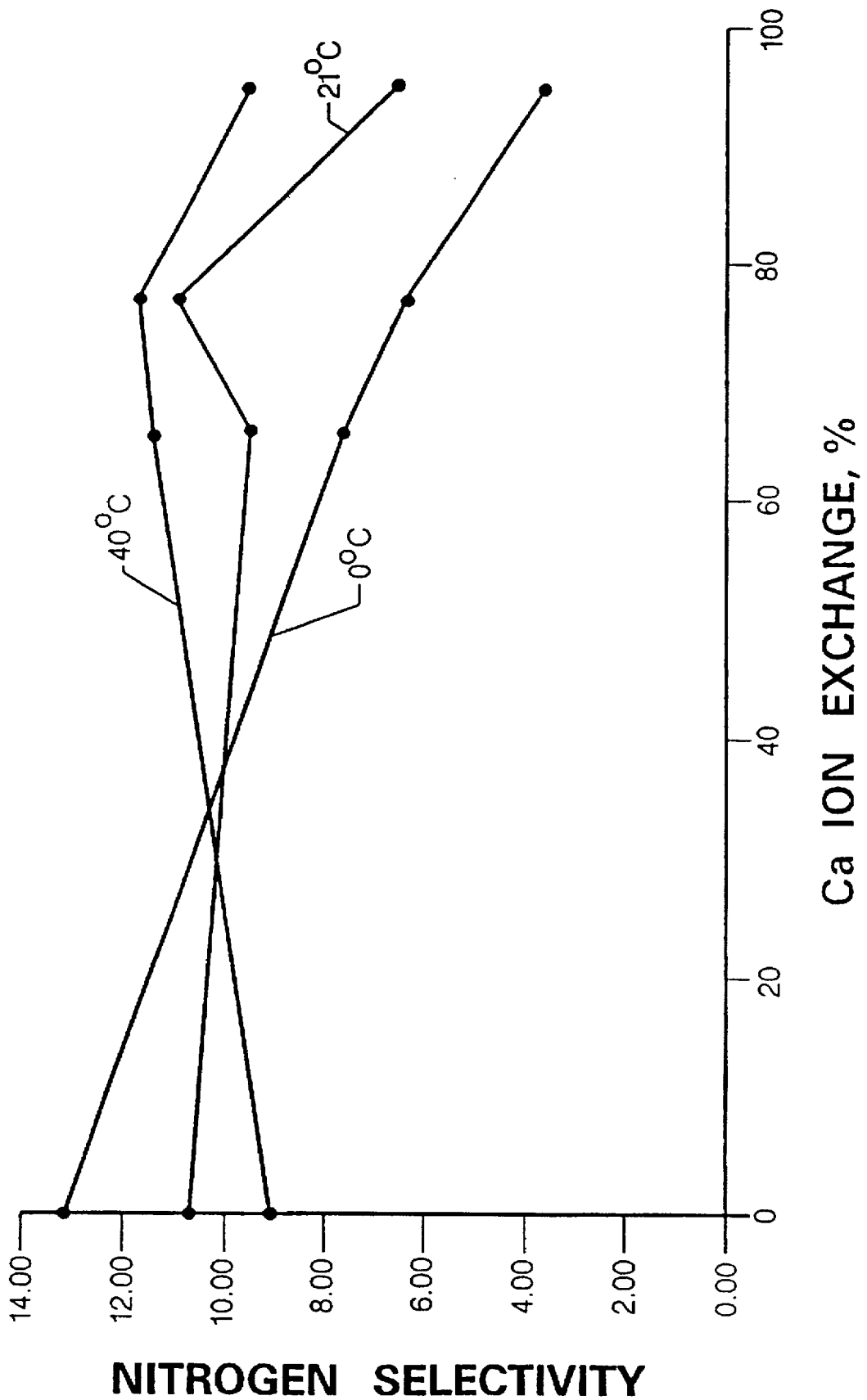

Following the procedure described in Example 4, supra, the nitrogen residual loading, nitrogen delta loading and the nitrogen operation selectivity of NaX2.5 and CaNaX2.5 samples 3a, 3b, and 3c of Example 3 were determined. The results are tabulated in Table V. FIGS. 7, 8, and 9 of the drawings disclose residual loadings and operational selectivity data as a function of calcium exchange levels and adsorption temperatures.

Example 7

To evaluate the desorption time needed for an adsorbent in a PSA cycle, the nitrogen desorption rate was measured with a Sartorius balance. The activated adsorbent was first brought into contact with nitrogen at a pressure of 101.3 kPa (one atmosphere). After adsorption equilibrium was reached, the gas was rapidly evacuated by a vacuum pump. The pump down step was terminated when pressure reached 1.4 kPa (0.2 psia). It required about 10 seconds to reach that pressure. The adsorbent was then allowed to reach its equilibrium and the weight loss of the adsorbent was continuously monitored. The final pressure in the Sartorius balance is a function of adsorption capacities of the adsorbent. For CaNaX of various silica to alumina ratios and different calcium exchange levels, the final pressure is in the range of 1.72 to 2.62 kPa (0.25 to 0.38 psia). Since nitrogen has large heat of desorption, a rapid desorption under adiabatic conditions causes a drop in adsorbent temperature. Vacuum desorption in a Sartorius balance closely approximates an adiabatic process. It is, however, very difficult to measure the sample temperature in a Sartorius balance directly, and accordingly the temperature after desorption was estimated by a comparison of the residual loading with the nitrogen isotherms at 20°, 0°, and –20° C., respectively.

Figure 10:
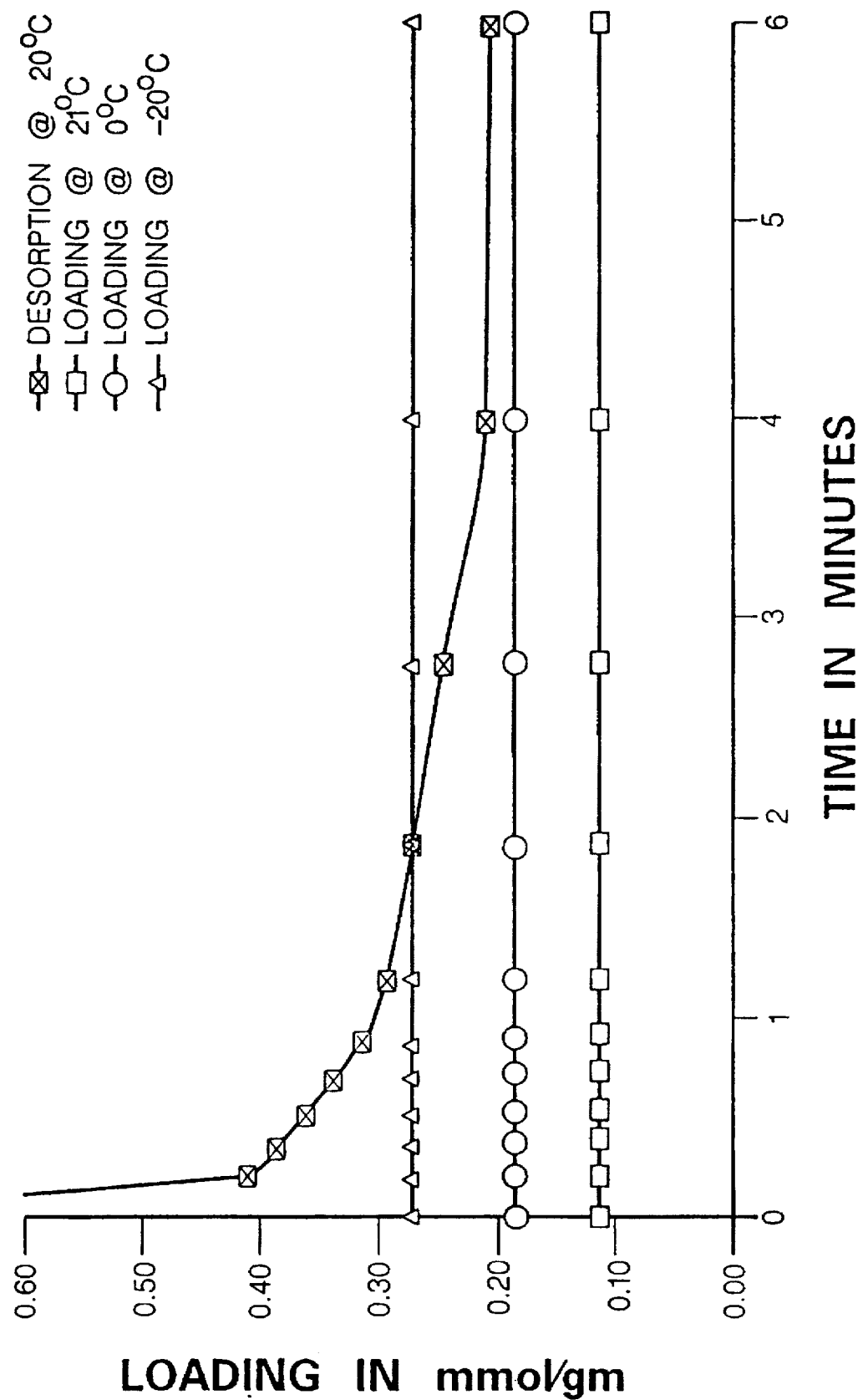
FIG. 10 gives desorption rate of CaX2.0 (97% Ca) at 22° C.

(a) The nitrogen desorption curve for sample 1g of Example 1, a highly calcium exchanged (97%) zeolite X having a $Si/Al_2$ molar ratio of 2.0, is shown in FIG. 10 of the drawings. To obtain the data, the vacuum-activated sample was first equilibrated in the Sartorius balance with nitrogen at 112.4 kPa (16.3 psia). The balance was then rapidly evacuated to 1.38 kPa (0.2 psia) and the sample allowed to reach equilibrium with a consequent rise in pressure to 2.62 kPa (0.38) psia). Also shown in FIG. 10 are the expected equilibrium nitrogen loadings at 2.62 kPa (0.38 psia) for the temperatures 20° C., 0° C., and –20° C. as determined by extrapolation from 10.3 to 2.62 k. Pa (1.5 to 0.38 psia). It appears from these data that the desorption in the Sartorius balance likely chilled the zeolite sample temperature to about 0° C.

(b) Using essentially the same procedure as in part (a) above, the nitrogen desorption curve for Sample 1d of Example 1 containing 75 equivalent percent calcium cations was determined. These data are set forth in FIG. 11. The final nitrogen pressure in the balance was 1.72 kPa (0.25 psia) and the residual loading was about 0.09 mmol/gram. From inspection of the expected equilibrium nitrogen loadings at 1.72 kPa (0.25 psia) (by extrapolation from 10.3 kPa (1.5 psia)) and 20° C., 0° C., and −20° C. also shown in FIG. 11, the sample appears to have been chilled during desorption to a temperature of about 10° C.

(c) Using the sample procedure as in part (a) above, the nitrogen desorption curves for Sample 2h of Example 2 containing 97 equivalent percent calcium cations was determined. These data are set forth in FIG. 12. The final nitrogen pressure in the balance was 2.55 kPa (0.37 psia) and the residual loading was about 0.38 mmol/gram. The equilibrium nitrogen loadings at 2.55 kPa (0.37 psia) at 20° C., 0° C., and −20° C., respectively, also shown in FIG. 12, were determined by extrapolation from 10.34 to 2.55 kPa (1.5 psia to 0.37 psia). The sample appears to have been chilled during desorption to a temperature of about 3° C.

Figure 13:
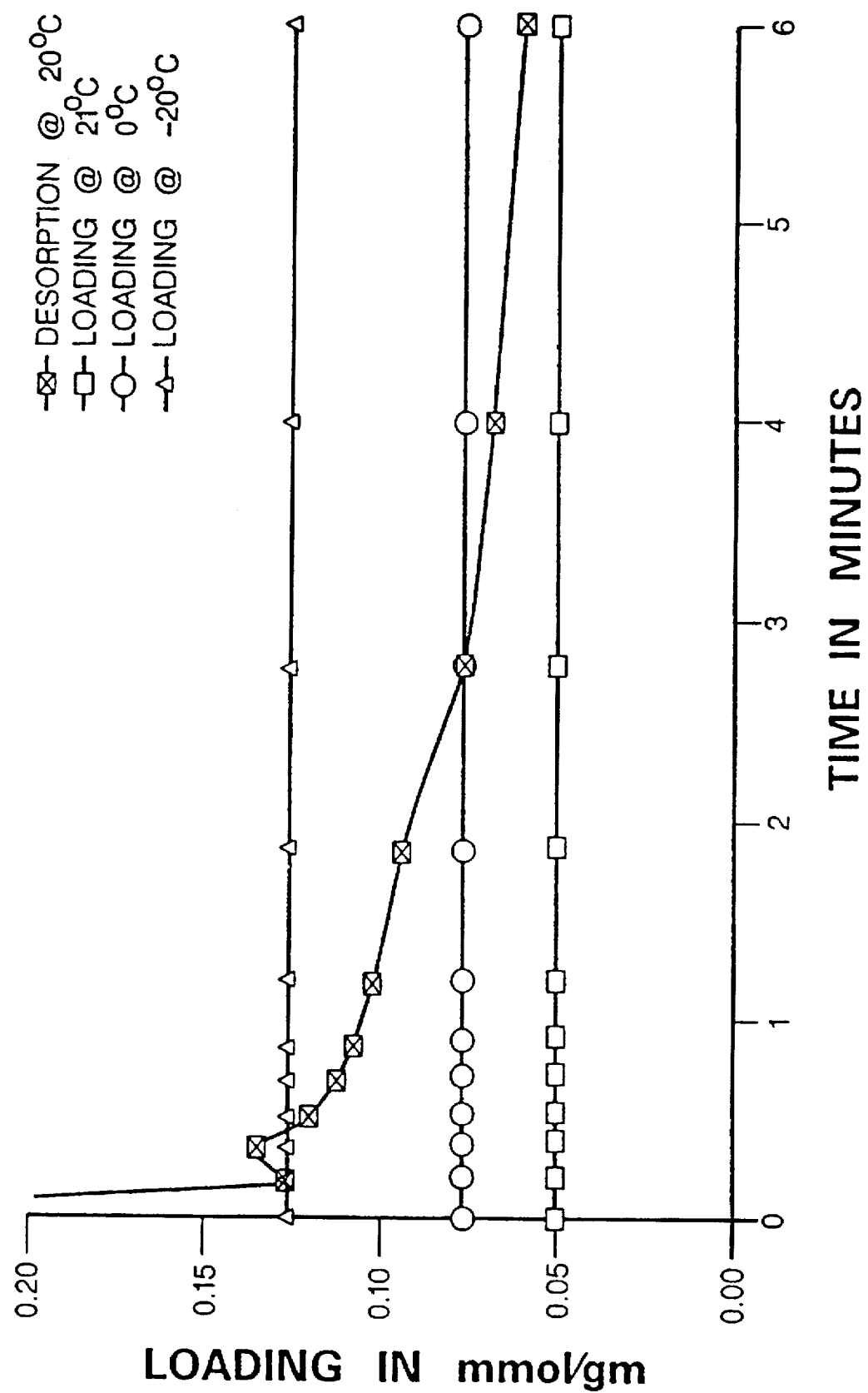
FIG. 13 gives desorption rate of CaNaX2.3 (77% Ca) at 22° C.

(d) Using the same procedure as in part (a) above, the nitrogen desorption curve for sample 2g of Example 2 containing 77 equivalent percent calcium cations was determined. These data are set forth in FIG. 13. The final nitrogen pressure in the balance was 1.93 kPa (0.28 psia) and the residual loading was about 0.07 mmol/gram. The expected equilibrium nitrogen loadings at 1.93 kPa (0.28 psia) at 20° C., 0° C., and −20° C., respectively, determined by extrapolation from 10.34 to 1.93 kpa (1.5 psia to 0.28 psia), are also shown in FIG. 13. From these data the sample appears to have been chilled during desorption to a temperature of about 5° C.

Figure 14:
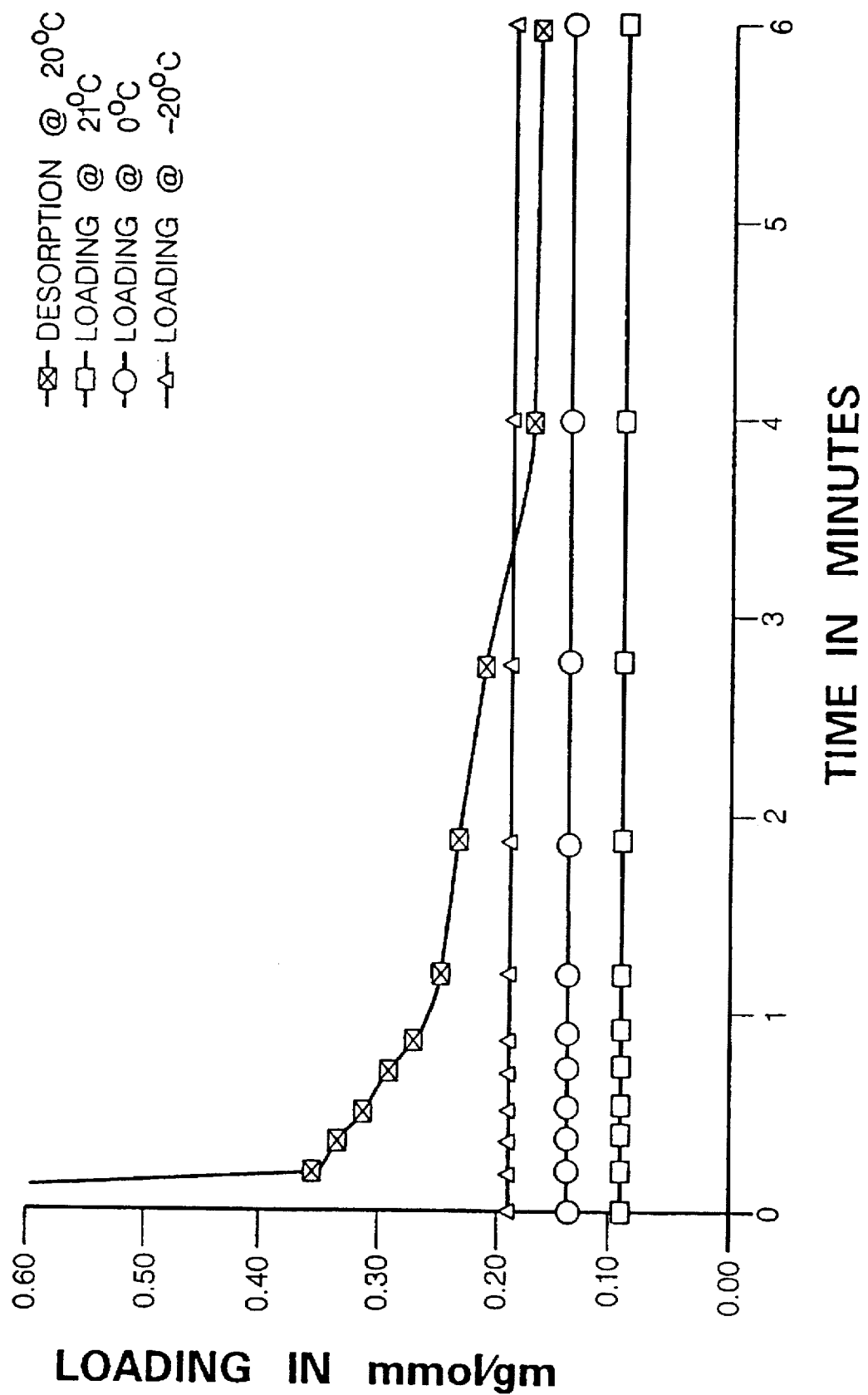
FIG. 14 gives desorption rate of CaX2.5 (97% Ca) at 22° C.
Figure 15:
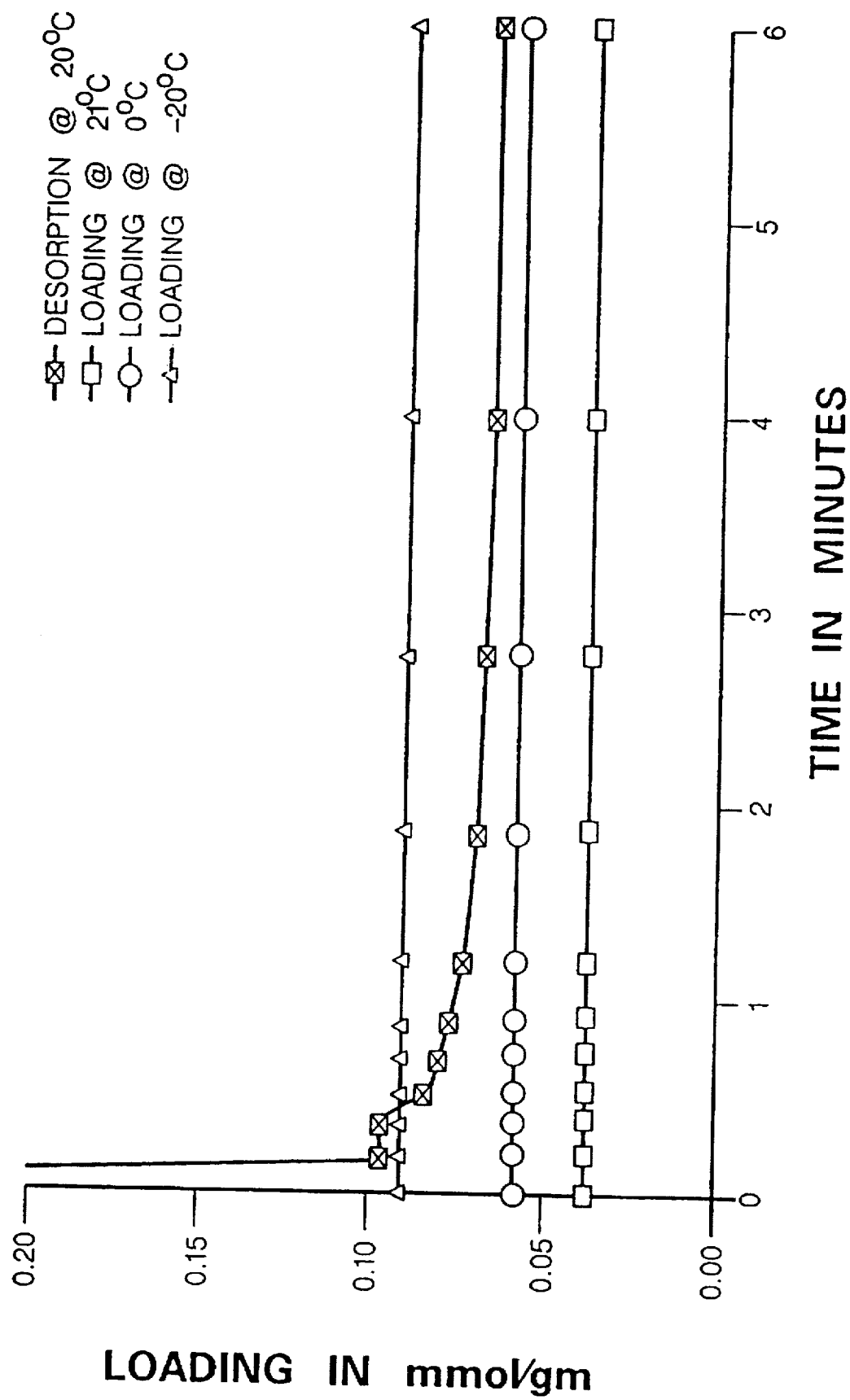
FIG. 15 gives desorption rate of CaNaX2.5 (77% Ca) at 22° C.

(e) Using the same procedure as in part (a) above, the nitrogen desorption curve for Sample 3d of Example 3 (containing 98 equivalent percent calcium cations) was determined. These data are set forth in FIG. 14. The final nitrogen pressure in the balance was 2.62 kPa (0.38 psia) and the residual loading was about 0.18 mmol/gram. The expected equilibrium nitrogen loadings at 2.41 kPa (0.35 psia) at 22° C., 30° C., and −20° C., determined by extrapolation from 10.34 to 2.62 kPa (1.5 to 0.38 psia), are also shown in FIG. 14. The sample appears to have been chilled during desorption to a temperature of about −13° C.

(f) Using the same procedure as in part (a) above, the nitrogen desorption curve for Sample 3b of Example 3 containing 77 equivalent percent calcium cations was determined. These data are set forth in FIG. 15. The final nitrogen pressure in the balance was 0.57 kPa (8.25 psia) and the residual loading was about 0.06 mmol/gram. From inspection of the expected equilibrium nitrogen loadings at 2.41 kPa (0.35 psia) at 22° C. and 0° C., also shown in FIG. 15, the sample appears to have been chilled during desorption to a temperature of about 3° C. The expected equilibrium loadings were determined by extrapolation from 10.34 to 1.72 kPa (1.5 psia to 0.25 psia).

Example 8

Samples of higher potassium ion-containing adsorbent were prepared from a sample of zeolite X in the form of 1/16 inch diameter pellets having a Si/Al$_2$ molar ratio of 2.0 and containing about 76 equivalent percent sodium and about 24 equivalent percent of potassium. The K$^+$ cations were removed to various levels ranging from about 6 to about 11 equivalent percent by the repeated batch ion exchange procedure described hereinabove with calcium chloride solution. Table VI presents the chemical composition of the these higher potassium-containing adsorbents. The potassium contents of the samples of Example 8 ranged from 6 to 11 equivalent percent potassium and from 79 to 56 equivalent percent calcium with the remainder being sodium.

Example 9

Adsorption isotherm data for nitrogen and oxygen of activated samples 8a, 8b, and 8c were determined at about 40° C., 20° C., and 0° C. as described in Example 4. The results of the air adsorption analyses are shown in Table VII. This data may be compared to the data for equivalent percentages of calcium exchange levels for the X2.0 samples and the equivalent adsorption temperatures shown in Table III. For example, in Table III, sample 1c, containing about 76 equivalent percent calcium, had a nitrogen delta loading of 0.14 and a nitrogen selectivity of about 12.86 which may be compared to sample 8c in Table VII which had a nitrogen delta loading of about 0.11 and nitrogen selectivity of about 12.0. These results demonstrate that at levels of potassium up to about 10 equivalent percent, the nitrogen loading and nitrogen selectivity are slightly lower than the equivalent percentage of sodium, but surprisingly, the influence of the potassium ion level on the nitrogen adsorption selectivity of the mixed ion exchanged NaKCaX2.0 follows the same general adsorption trends as described in Examples 1–7 with respect to sodium ions.

The effectiveness of an adsorbent for air separation is measured by three parameters, i.e., nitrogen delta loading, nitrogen operational selectivity, and residual nitrogen loading at the desorption pressure. Taking these parameters into account, the data of the Tables of the specification and the Figures of the drawings, including the following specific observations, clearly establish the superiority of the present invention.

The adsorption data of clay-bonded X2.0 samples are given in Table III. The nitrogen residual loadings are plotted against calcium ion-exchange levels in FIG. 1. This establishes that as the calcium cation level of the zeolite adsorbent increases, the desorption of nitrogen progressively becomes more difficult; therefore the residual loading increases. At calcium levels of 90% or more, the residual nitrogen loading becomes so high, product contamination becomes a serious problem. The residual nitrogen level is also sensitive to temperature. A combination of a 90% calcium level along with an operating temperature of 0° C. brings the residual nitrogen to an unacceptably high level. Since cooling always occurs in PSA processes, these data demonstrate that 90% or more calcium exchange can impair efficiency of X2.0 in more than one way.

Figure 2:
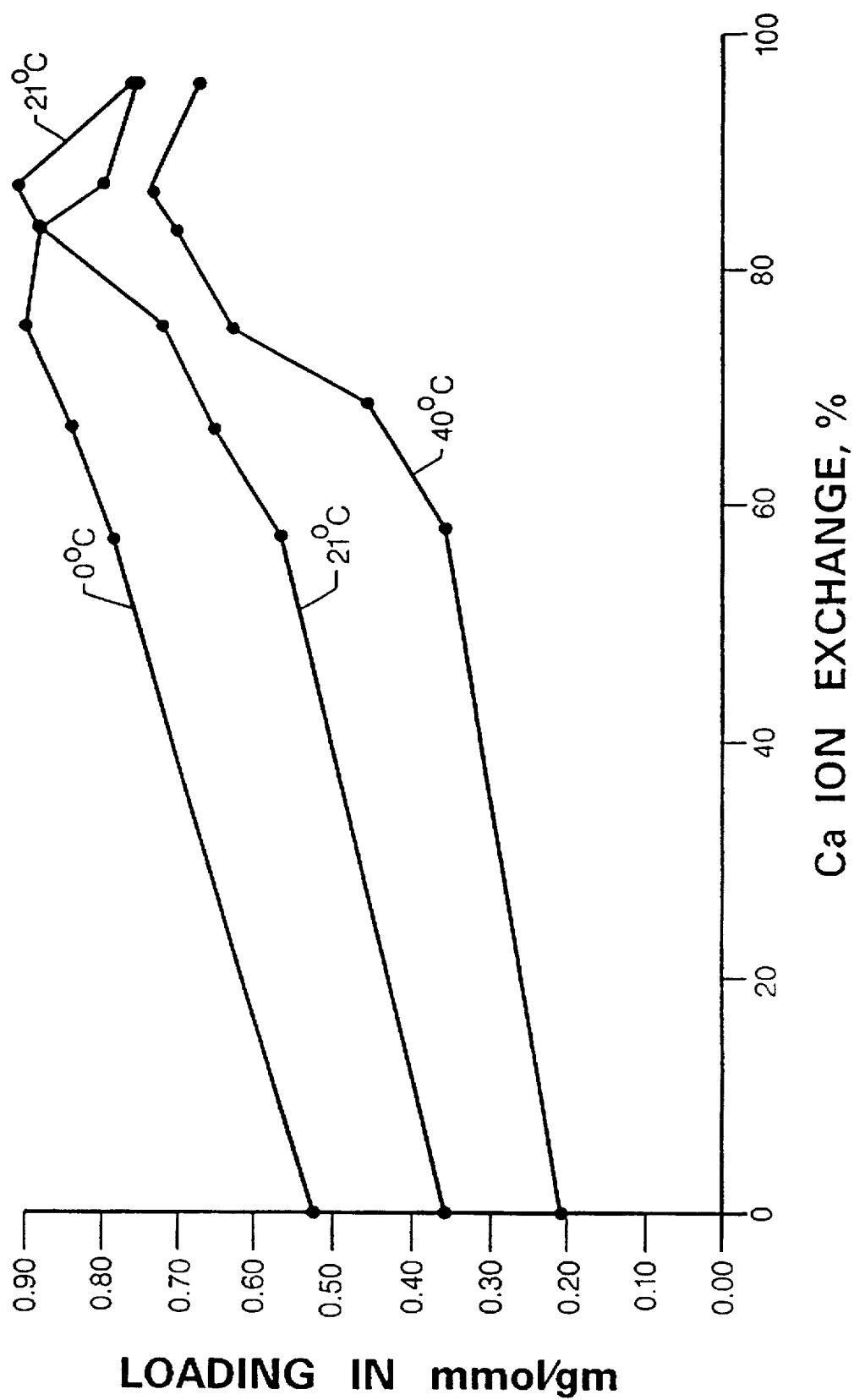
FIG. 2 plots nitrogen delta loading of CaNaX2.0 between 101 kPa and 10.7 kPa (14.7 and 1.55 psia) as a function of calcium exchange level at 40° C., 20° C., and 0° C., respectively.

FIG. 2 gives the nitrogen delta loading between 101.3 to 10.69 kPa (14.7 and 1.55 psia) of CaNaX2.0 as a function of calcium level and adsorption temperature. Initially as the calcium content increases the delta loading of nitrogen also increases. The delta loading reaches a broad maximum and starts to descend. These data demonstrate that calcium exchange levels higher than 90% or lower than 60% are desirable.

Figure 3:
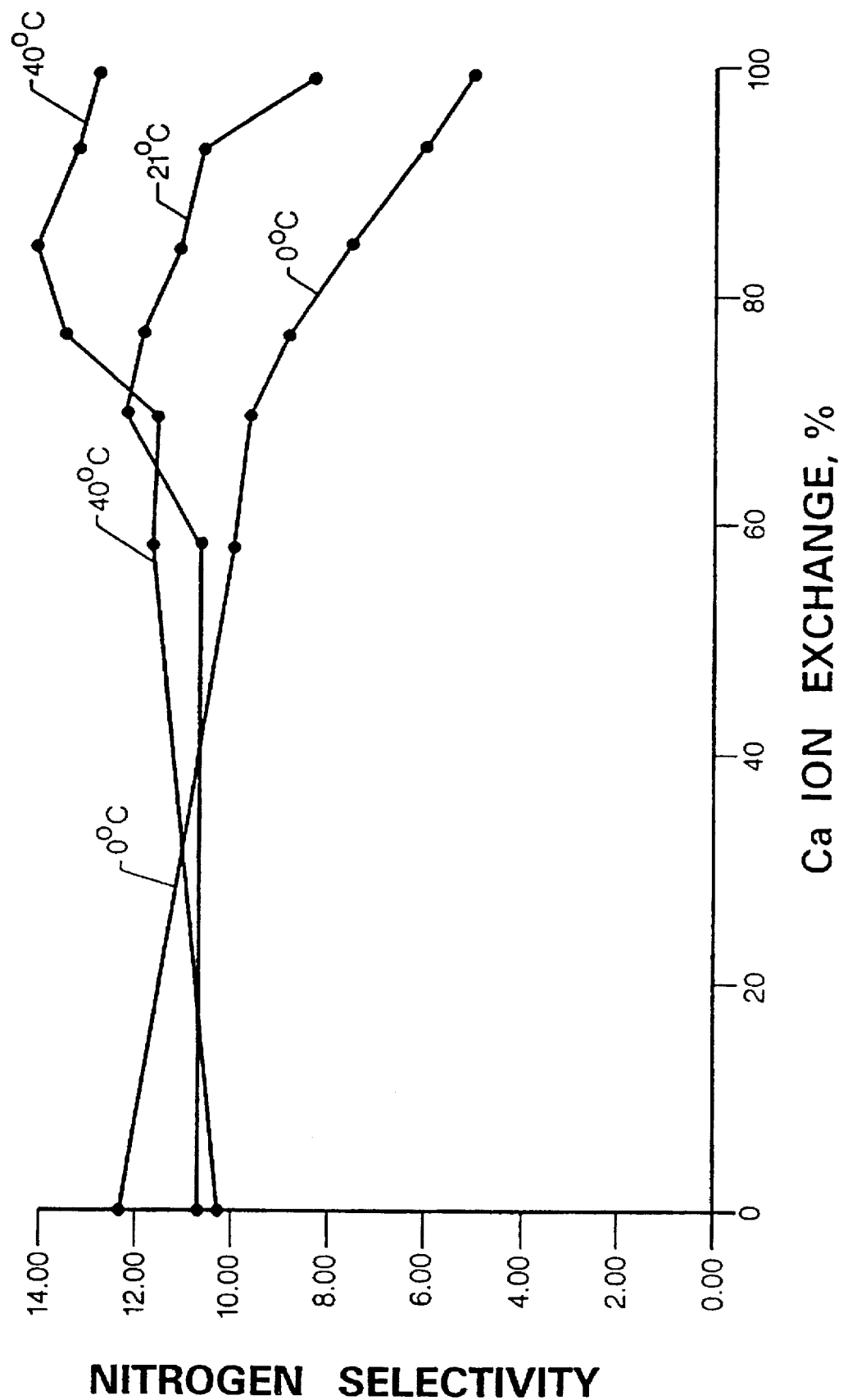
FIG. 3 plots nitrogen operational selectivity of CaNaX2.0 as a function of calcium exchange level at 40° C., 20° C., and 0° C., respectively.

FIG. 3 gives operational selectivity of X2.0 as a function of the calcium exchange level and temperature. Here is a clear example how temperature can override the influence of cation. At 40° C., the nitrogen operational selectivity increases as the calcium content increases. It peaks around 85% Ca$^{++}$ exchange and then begins to decline. At 20° C., the peak operational selectivity is in the region of 60 to 80% calcium content area. At temperatures of 0° C. or lower, CaX2.0 has higher operational selectivity than does CaNaX2.0. At −20° C. the nitrogen selectivity of CaNaX2.0 is substantially lower than that of NaX2.0.

The adsorption data of X2.3 samples are given in Table IV. FIGS. 4, 5, and 6 give residual loadings, delta loadings, and operational selectivity data of X2.3 powder as a function of calcium exchange levels and adsorption temperatures. Since these samples do not contain clay, their loadings are higher than corresponding bonded samples. Results of X2.3 samples are parallel to those of X2.0. The use of an X2.3 with 90% or more of its cations in $Ca^{++}$ form and a process temperature of 0° C. is clearly not desirable. For an ambient process cycle with significant temperature excursion, a CaNaX2.3 with a calcium level of at least 60%, and less than 90%, is preferred. Generally, the operational selectivity of CaNaX2.3 is lower than that of the CaNaX2.0 adsorbent.

The adsorption data of bonded X2.5 beads are given in Table V. These data along with the residual loadings, delta loadings, and operational selectivities plotted against calcium exchange levels in FIGS. 7, 8, and 9, provide an outstanding example that the performance of a PSA adsorbent is not determined by single structure parameters. Silica-to-alumina ratio is equally as important as calcium level. The nitrogen delta loadings of X2.5 increase and the nitrogen operational selectivities decrease as the calcium levels increase. This is basically the same pattern observed in the case of X2.0 and X2.3, but with an important difference in detail. The nitrogen delta loadings of CaNaX2.5 in the 60% to 90% range are very much lower than their X2.3 and X2.0 counterparts. It is largely for this reason that CaNaX2.5 is not employed in the practice of the present invention.

The data of FIG. 1 show that the residual loading or nitrogen loading at 10.7 kPa (2.55 psia) increases rapidly as the calcium content in the zeolite increases. The rate of increase is inversely proportional to the adsorption temperature. At 0° C., the residual loading of 97% calcium exchanged X2.0 is 0.79 mmol/gram which is higher than its delta loading (0.74 mmol/gram). Accordingly, it would be much more difficult to produce pure oxygen at 0° C. using a CaX2.0 adsorbent. At 20° C., its residual nitrogen loading is 0.39 mmol/gram, which is high, but this adsorbent can function well using a proper process cycle. On the other hand, with a calcium level at 76 equivalent percent, the nitrogen residual loadings are 0.46 mmol/gram at 0° C., which is about same as the CaX at 201° C. The residual loading of CaNaX2.0 at 20° C. is 0.25 mmol/gram. CaNaX2.0 (76%) will be able to function even at 0° C. and is, therefore, much favored.

With reference to FIG. 2, at 0° C. the nitrogen delta loading is at a maximum at a calcium content of 75%. At 20° C. and 40° C., it peaks at a calcium content of about 90%.

Based on the nitrogen delta loading, the 75% exchanged CaNaX2.0 would have a clear advantage over a 97% exchanged CaX2.0.

In FIG. 3 it is shown that a 76% exchanged CaNaX2.0 has a higher operational selectivity than a 97% exchanged CaX2.0 at 20° C. and 0° C. These data establish that the use of a CaNaX2.0 provides greater flexibility in choosing process conditions than is the case with CaX2.0.

Figure 11:
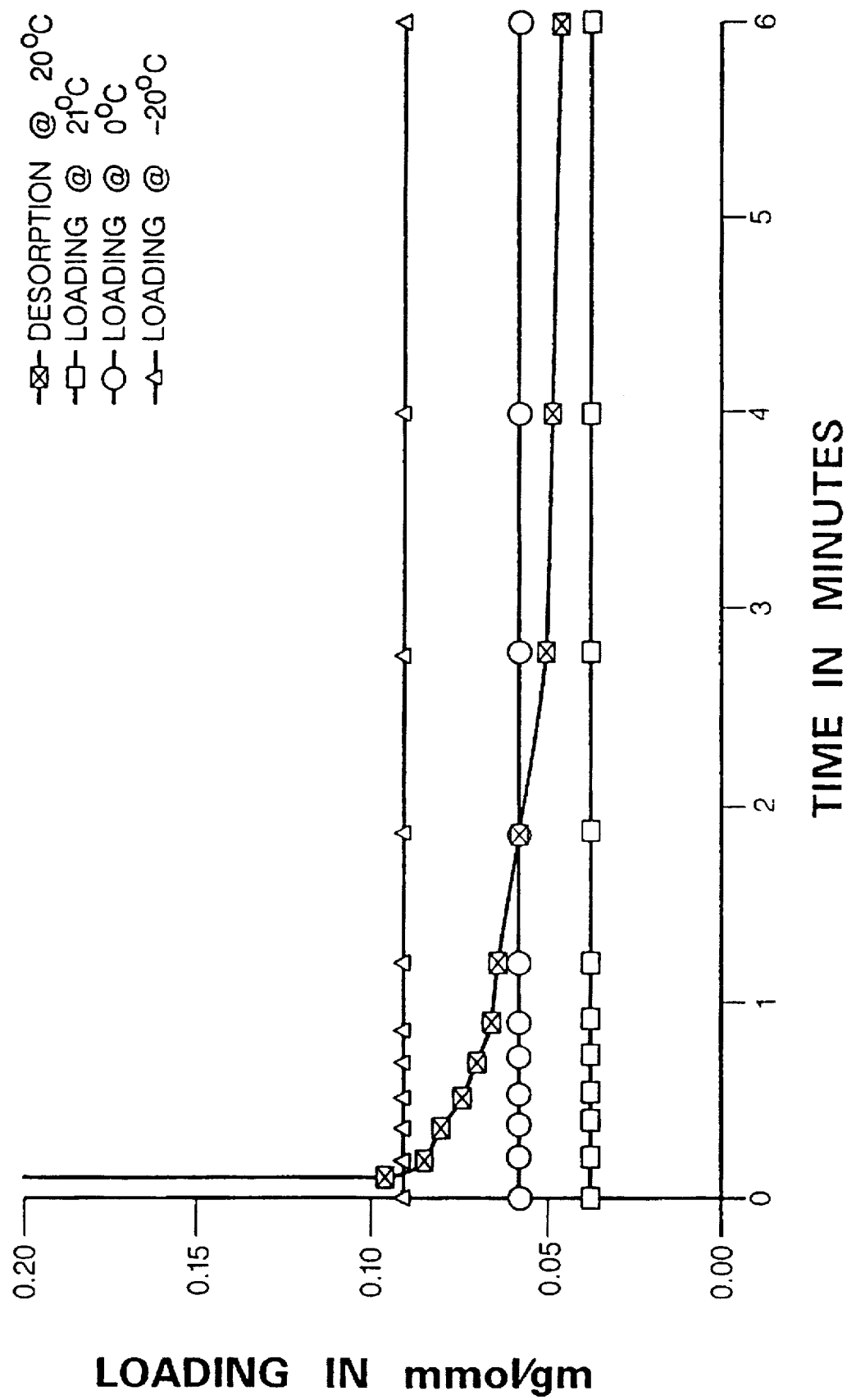
FIG. 11 gives desorption rate of CaNaX2.0 (75% Ca) at 22° C.

With reference to the desorption curves of FIG. 10 and FIG. 11, it can be seen that one minute into the desorption process, the residual loading on sample 1g [CaX2.0 (97% Ca)] is six times that of sample 1d [CaNaX2.0's (75% Ca)]. These data suggest that the highly exchanged zeolite will require a longer time to regenerate than the less highly exchanged composition. Another important implication of these data is that after desorption the highly exchanged material may have a significantly lower temperature than the more moderately exchanged zeolite. The drop in adsorbent temperature compounds the problems experienced with very highly $Ca^{++}$ exchanged forms of zeolite X because they are very inefficient at low temperatures.

Figure 12:
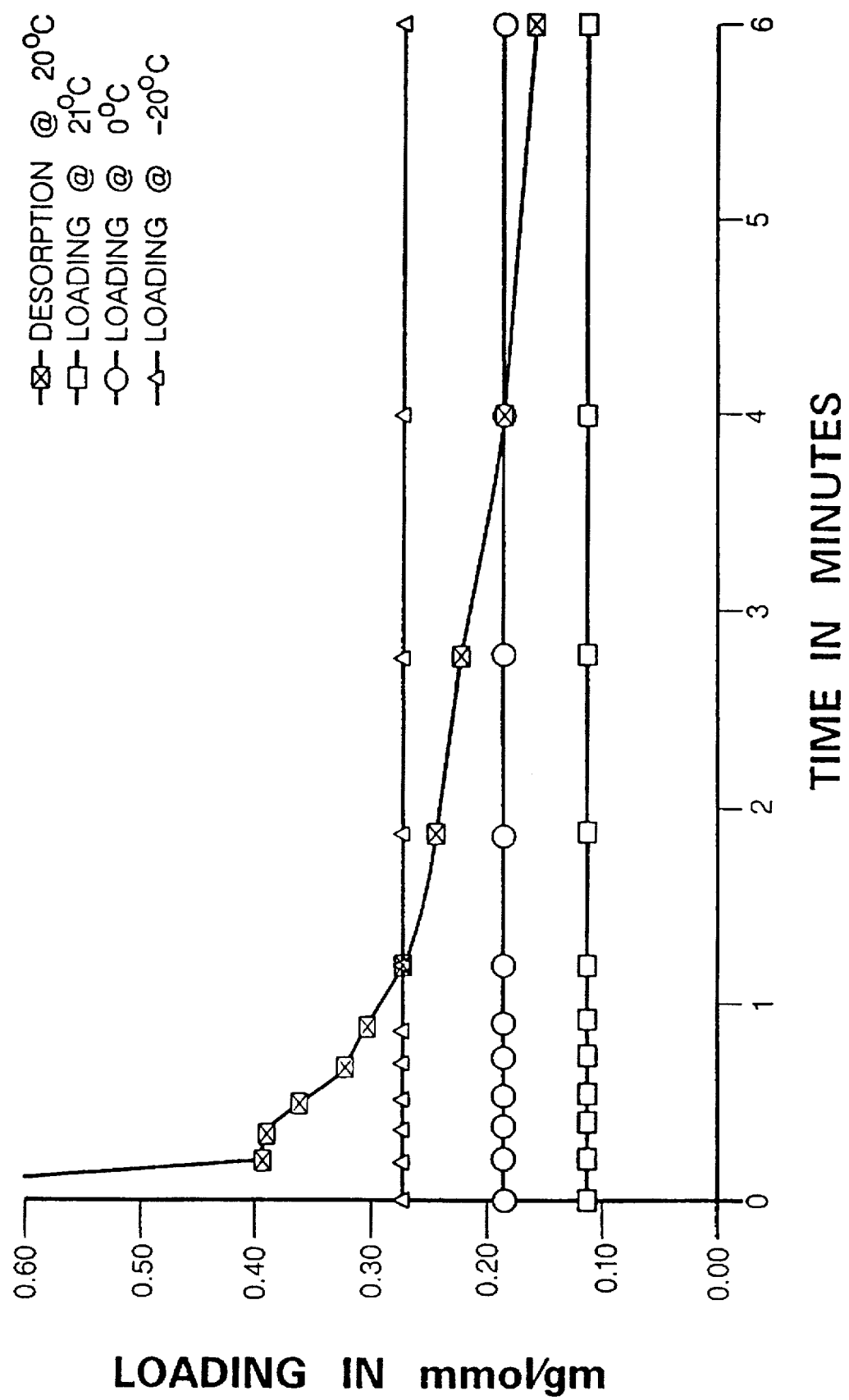
FIG. 12 gives desorption rate of CaX2.3 (97% Ca) at 22° C.

The nitrogen desorption curves of CaX2.3 (97% Ca) and the expected equilibrium adsorption capacities at 2.55 kPa (0.37 psia) are given in FIG. 12. The desorption curve of CaNaX2.3 (77% Ca) and its expected equilibrium adsorption capacities at 1.72 kPa (0.25 psia) are given in FIG. 13. The residual loading of CaX2.3 is about 0.17 mmol/gram, and its estimated temperature after desorption is about 3° C. The residual loading of CaNaX2.3 is about 0.05 mmol/gram, and the estimated temperature after desorption is about 9° C. Again, the 77% calcium exchanged X2.3 is a more efficient adsorbent than is the 97% exchanged counterpart.

The nitrogen desorption curve of CaX2.5 (97% Ca) and its expected equilibrium adsorption capacities at 262 kPa (38 psia) are given in FIG. 13. The desorption curve of CaNaX2.5 (77% Ca) and its expected adsorption capacities at 1.72 kPa (0.25 psia) are given in FIG. 14. The residual loading of CaX2.5 is about 0.17 mmol/gram, and its temperature after desorption is estimated to be about −13° C. The equilibrium loading of CaNaX2.3 is about 0.07 mmol/gram, and its temperature after desorption is estimated to be about −3° C. It is surprising to see that CaNaX2.5 has a residual loading equivalent to −3° C. However, it is consistent with the fact that CaNaX2.5 is a poor PSA adsorbent relative to CaNaX2.0 and CaNaX2.3.

TABLE 1

PREPARATION PROCEDURES AND DESCRIPTION OF SAMPLES

| SAMPLE TYPE | SAMPLE # | PREPARATION PROCEDURE* | FORM |
|---|---|---|---|
| NaX2.0 | | Starting Material | 8 × 12 beads |
| CaNaX2.0 | 1a | (1) batch ion exchange NaX2.0 beads, with 0.15M $CaCl_2$, pH9, 90° C. 1 hr. | 8 × 12 beads |
| CaNaX2.0 | 1b | (1.5) batch ion exchange NaX2.0 beads with 0.23M $CaCl_2$, pH9, 90° C. 1 hr. | 8 × 12 beads |
| CaNaX2.0 | 1c | (2.0) batch ion exchange NaX2.0 beads, with 0.3M $CaCl_2$, pH9, 90° C. 1 hr. | 8 × 12 beads |
| CaNaX2.0 | 1d | (1.5) batch ion exchange NaX2.0 beads, with 0.57M $CaCl_2$, pH9, 80° C. 1.5 hr. | 8 × 12 beads |
| CaNaX2.0 | 1e | (4.0) batch ion exchange NaX2.0 beads, with 0.6M $CaCl_2$, pH9, 90° C. 1 hr. | 8 × 12 beads |
| CaNaX2.0 | 1f | (10) batch ion exchange NaX2.0 beads, with 1M $CaCl_2$, pH9, 90° C. 1 hr. | 8 × 12 beads |
| CaNaX2.0 | 1g | (2) then (10) consecutive batch ion exchanges with $CaCl_2$ | 8 × 12 beads |
| NaX2.3 | | Starting Material | Powder |
| CaNaX2.3 | 2a | (0.8) $CaCl_2$ batch ion exchange of NaX2.3 powder, 0.4M, pH9, 95° C. | Powder |
| CaNaX2.3 | 2b | (1.0) $CaCl_2$ batch ion exchange of NaX2.3 powder, 0.33M, pH9, 95° C. | Powder |
| CaNaX2.3 | 2c | (1.2) $CaCl_2$ batch ion exchange of NaX2.3 powder, 0.4M, pH9, 95° C. | Powder |
| CaNaX2.3 | 2d | (2.4) $CaCl_2$ batch ion exchange of NaX2.3 powder, 0.83M, pH9, 95° C. | Powder |
| CaNaX2.3 | 2e | (5.0) $CaCl_2$ batch ion exchange of NaX2.3 powder, 0.83M, pH9, 95° C. | Powder |
| CaX2.3 | 2f | (10) $CaCl_2$ batch ion exchange of NaX2.3 powder, twice, 1.9M, pH9, 95° C. | Powder |
| CaNaX2.3 | 2g | (1.0) $CaCl_2$ batch ion exchange of NaX2.3 beads | 8 × 12 beads |
| CaX2.3 | 2h | (6) CaCl column ion exchange of NaX2.3 beads pH9, 95° C. | 8 × 12 beads |

TABLE 1-continued

PREPARATION PROCEDURES AND DESCRIPTION OF SAMPLES

| SAMPLE TYPE | SAMPLE # | PREPARATION PROCEDURE* | FORM |
|---|---|---|---|
| NaX2.5 | | Comparison Sample | 16 × 40 mesh |
| CaNaX2.5 | 3a | (1.2) CaCl$_2$ batch ion exchange of NaX2.5 beads pH8, 95° C. | 8 × 12 beads |
| CaNaX2.5 | 3b | (2) CaCl$_2$ batch ion exchange of NaX2.5 beads pH8, 95° C. | 8 × 12 beads |
| CaX2.5 | 3c | (6) column ion exchange of NaX2.5 beads pH8, 95° C. | 8 × 12 beads |
| CaX2.5 | 3d | (6) column ion exchange of NaX2.5 beads pH8, 95° C. | 8 × 12 beads |

*Figure in parentheses denotes the number of stoichiometric quantities of CaCl$_2$ employed with respect to zeolitic Na$^+$ ions to be exchanged

TABLE II

CHEMICAL ANALYSIS RESULTS OF SAMPLES

| Sample Type | Sample # | LOI* wt % | Al$_2$O$_3$ wt % dry basis | SiO$_2$ wt % dry basis | Na$_2$O wt % dry basis | CaO wt % dry basis | Calcium content, Equivalents |
|---|---|---|---|---|---|---|---|
| NaX2.0 | | 21.60 | 32.40 | 45.28 | 18.11 | | 0.00 |
| CaNaX2.0 | 1a | 23.80 | 32.94 | 45.28 | 8.65 | 10.45 | 0.57 |
| CaNaX2.0 | 1b | 24.00 | 33.03 | 45.39 | 6.32 | 12.64 | 0.69 |
| CaNaX2.0 | 1c | 24.30 | 33.29 | 45.84 | 4.91 | 14.00 | 0.76 |
| CaNaX2.0 | 1d | 23.80 | 33.07 | 47.28 | 5.13 | 13.52 | 0.75 |
| CaNaX2.0 | 1e | 24.50 | 33.11 | 45.30 | 3.13 | 15.89 | 0.85 |
| CaNaX2.0 | 1f | 24.70 | 32.93 | 45.55 | 2.05 | 16.60 | 0.90 |
| CaNaX2.0 | 1g | 24.90 | 33.69 | 45.94 | 0.67 | 18.24 | 0.97 |
| NaX2.3 | | | 25.20 | 35.00 | 14.80 | | 0.00 |
| CaNaX2.3 | 2a | 27.80 | 34.21 | 46.68 | 8.09 | 11.25 | 0.61 |
| CaNaX2.3 | 2b | 26.60 | 34.20 | 47.28 | 6.46 | 12.82 | 0.69 |
| CaNaX2.3 | 2c | 28.10 | 34.49 | 47.15 | 6.11 | 13.32 | 0.71 |
| CaNaX2.3 | 2d | 27.20 | 34.48 | 46.84 | 4.24 | 14.97 | 0.80 |
| CaNaX2.3 | 2e | 28.30 | 34.59 | 47.00 | 2.72 | 16.46 | 0.87 |
| CaX2.3 | 2f | 28.55 | 33.45 | 46.89 | 0.66 | 19.03 | 0.97 |
| CaNaX2.3 | 2g | 25.00 | | | 4.26 | 12.64 | 0.77 |
| CaNaX2.3 | 2h | 26.10 | 31.80 | 49.53 | 0.18 | 17.49 | 0.99 |
| NaX2.5 | | 24.40 | 32.54 | 48.54 | 17.72 | 0.00 | 0.00 |
| CaNaX2.5 | 3a | 25.20 | 31.02 | 50.94 | 6.42 | 11.43 | 0.66 |
| CaNaX2.5 | 3b | 25.10 | | | 4.33 | 13.09 | 0.77 |
| CaNaX2.5 | 3c | 26.20 | | | 0.41 | 16.49 | 0.98 |
| CaX2.5 | 3d | 25.10 | | | 0.40 | 17.24 | 0.98 |

*LOI = Loss on Ignition at 1000° C.

TABLE III

AIR ADSORPTION DATA OF X2.0

| A Sample Type | B Ca Content, Equiv. % | C Sample # | D Adsorption Temperature °C. | E N$_2$ Loading at 1.55 psia in mmol/gm | F N$_2$A Loading in mmol/gm (14.7–1.55)psia | G O$_2$ Loading at 3.7 psia mmol/gm | H N$_2$ Operational Selectivity, N$_2$A loading/ O$_2$ loading at 3.7 psia |
|---|---|---|---|---|---|---|---|
| NaX2.0 | 0 | | 41.5 | 0.03 | 0.21 | 0.02 | 10.32 |
| CaNaX2.0 | 57 | 1a | 40 | 0.06 | 0.36 | 0.03 | 11.74 |
| CaNaX2.0 | 69 | 1b | 40 | 0.08 | 0.42 | 0.04 | 11.83 |
| CaNaX2.0 | 76 | 1c | 40 | 0.14 | 0.57 | 0.04 | 12.86 |
| CaNaX2.0 | 85 | 1e | 40 | 0.18 | 0.72 | 0.05 | 13.78 |
| CaNaX2.0 | 90 | 1f | 40 | 0.22 | 0.75 | 0.06 | 12.79 |
| CaNaX2.0 | 97 | 1g | 40 | 0.23 | 0.69 | 0.06 | 12.32 |
| NaX2.0 | 0 | | 22 | 0.05 | 0.36 | 0.03 | 10.85 |
| CaNaX2.0 | 57 | 1a | 21 | 0.13 | 0.55 | 0.05 | 10.74 |
| CaNaX2.0 | 69 | 1b | 21 | 0.17 | 0.63 | 0.05 | 12.07 |
| CaNaX2.0 | 76 | 1c | 20.6 | 0.25 | 0.75 | 0.07 | 11.52 |
| CaNaX2.0 | 85 | 1e | 21 | 0.34 | 0.84 | 0.08 | 10.75 |
| CaNaX2.0 | 90 | 1f | 21.7 | 0.40 | 0.85 | 0.08 | 10.39 |
| CaNaX2.0 | 97 | 1g | 20 | 0.39 | 0.74 | 0.09 | 8.60 |
| NaX2.0 | 0 | | 0 | 0.07 | 0.51 | 0.04 | 12.69 |
| CaNaX2.0 | 57 | 1a | 0 | 0.26 | 0.74 | 0.07 | 10.09 |

TABLE III-continued

AIR ADSORPTION DATA OF X2.0

| A Sample Type | B Ca Content, Equiv. % | C Sample # | D Adsorption Temperature °C. | E N₂ Loading at 1.55 psia in mmol/gm | F N₂A Loading in mmol/gm (14.7–1.55)psia | G O₂ Loading at 3.7 psia mmol/gm | H N₂ Operational Selectivity, N₂A loading/ O₂ loading at 3.7 psia |
|---|---|---|---|---|---|---|---|
| CaNaX2.0 | 69 | 1b | 0 | 0.32 | 0.79 | 0.08 | 9.87 |
| CaNaX2.0 | 76 | 1c | 0 | 0.46 | 0.85 | 0.10 | 8.57 |
| CaNaX2.0 | 85 | 1e | 0 | 0.62 | 0.84 | 0.13 | 6.65 |
| CaNaX2.0 | 90 | 1f | 0 | 0.75 | 0.79 | 0.14 | 5.55 |
| CaNaX2.0 | 97 | 1g | 0 | 0.79 | 0.74 | 0.15 | 4.91 |

TABLE IV

AIR ADSORPTION DATA OF X2.3

| A Sample Type | B Ca Content, Equiv. % | C Sample # | D Adsorption Temperature °C. | E N₂ Loading at 1.55 psia in mmol/gm | F N₂A Loading in mmol/gm (14.7–1.55)psia | G O₂ Loading at 3.7 psia mmol/gm | H N₂ Operational Selectivity, N₂A loading/ O₂ loading at 3.7 psia |
|---|---|---|---|---|---|---|---|
| NaX2.3 | 0 | | 40.5 | 0.03 | 0.27 | 0.03 | 9.28 |
| CaNaX2.3 | 60.0 | 2a | 40 | 0.08 | 0.45 | 0.04 | 11.58 |
| CaNaX2.3 | 68.7 | 2b | 40 | 0.11 | 0.51 | 0.04 | 11.76 |
| CaNaX2.3 | 70.7 | 2c | 40 | 0.12 | 0.55 | 0.04 | 12.64 |
| CaNaX2.3 | 79.6 | 2d | 40 | 0.18 | 0.64 | 0.05 | 12.12 |
| CaNaX2.3 | 87.0 | 2e | 40 | 0.22 | 0.67 | 0.06 | 11.72 |
| CaNaX2.3 | 97 | 2f | 40 | 0.25 | 0.76 | 0.07 | 10.58 |
| NaX2.3 | 0 | | 21.1 | 0.06 | 0.43 | 0.04 | 10.67 |
| CaNaX2.3 | 60.6 | 2a | 20.6 | 0.15 | 0.59 | 0.05 | 11.26 |
| CaNaX2.3 | 68.7 | 2b | 20 | 0.20 | 0.66 | 0.06 | 11.29 |
| CaNaX2.3 | 70.7 | 2c | 23.7 | 0.22 | 0.71 | 0.06 | 11.00 |
| CaNaX2.3 | 79.6 | 2d | 21.6 | 0.32 | 0.78 | 0.08 | 10.25 |
| CaNaX2.3 | 87.0 | 2e | 20 | 0.41 | 0.76 | 0.09 | 8.79 |
| CaNaX2.3 | 97 | 2f | 20 | 0.47 | 0.85 | 0.11 | 7.88 |
| NaX2.3 | 0 | | 0 | 0.10 | 0.69 | 0.06 | 12.22 |
| CaNaX2.3 | 60.6 | 2a | 0 | 0.27 | 0.78 | 0.08 | 9.98 |
| CaNaX2.3 | 68.7 | 2b | 0 | 0.41 | 0.82 | 0.10 | 8.35 |
| CaNaX2.3 | 70.7 | 2c | 0 | 0.43 | 0.83 | 0.10 | 8.19 |
| CaNaX2.3 | 79.6 | 2d | 0 | 0.59 | 0.81 | 0.13 | 6.39 |
| CaNaX2.3 | 87.0 | 2e | 0 | 0.66 | 0.73 | 0.14 | 5.06 |
| CaNaX2.3 | 97 | 2f | 0 | 0.78 | 0.73 | 0.17 | 4.39 |

TABLE V

AIR ADSORPTION DATA OF X2.5

| Sample Type | Ca Content Equiv. % | Sample # | Adsorption Temp. °C. | N₂ Loading at 1.55 psia | N₂A Loading (14.7–1.55 psia) | O₂ Loading at 3.7 psia | N₂ Operational Selectivity, N₂A Loading/O₂ Loading at 3.7 |
|---|---|---|---|---|---|---|---|
| NaX2.5 | 0 | | 40 | 0.03 | 0.25 | 0.03 | 8.97 |
| CaNaX2.5 | 66 | 3a | 40 | 0.10 | 0.27 | 0.02 | 11.32 |
| CaNaX2.5 | 77 | 3b | 40 | 0.13 | 0.49 | 0.04 | 11.42 |
| CaNaX2.5 | 98 | 3c | 40 | 0.26 | 0.68 | 0.07 | 9.53 |
| NaX2.5 | 0 | | 22.7 | 0.05 | 0.37 | 0.03 | 10.85 |
| CaNaX2.5 | 66 | 3a | 20.6 | 0.14 | 0.48 | 0.05 | 9.48 |
| CaNaX2.5 | 77 | 3b | 21 | 0.23 | 0.54 | 0.05 | 10.50 |
| CaNaX2.5 | 98 | 3c | 22 | 0.45 | 0.72 | 0.11 | 6.54 |
| NaX2.5 | 0 | | 0 | 0.10 | 0.63 | 0.05 | 12.98 |
| CaNaX2.5 | 66 | 3a | 0 | 0.24 | 0.57 | 0.07 | 7.80 |
| CaNaX2.5 | 77 | 3b | 0 | 0.41 | 0.64 | 0.10 | 6.57 |
| CaNaX2.5 | 98 | 3c | 0 | 0.75 | 0.66 | 0.18 | 3.63 |

TABLE VI

CHEMICAL ANALYSIS RESULTS OF CaNaKX2.0

| SAMPLE TYPE | SAMPLE # | LOI wt % | $AL_2O_3$ DRY BASIS | $SIO_2$ DRY BASIS | $NA_2O$ DRY BASIS | NA CONTENT EQU. FRACT. | $K_2O$ DRY BASIS | K CONTENT EQU. FRACT. | CAO DRY BASIS | CA CONTENT |
|---|---|---|---|---|---|---|---|---|---|---|
| CaNaKX2.0 | 8a | 23.30 | 34.03 | 45.50 | 6.74 | 0.53 | 3.31 | 0.11 | 9.87 | 0.56 |
| CaNaKX2.0 | 8b | 23.30 | 34.16 | 45.63 | 6.22 | 0.31 | 2.95 | 0.10 | 10.86 | 0.60 |
| CaNaKX2.0 | 8c | 24.10 | 34.39 | 45.59 | 3.07 | 0.15 | 1.96 | 0.06 | 14.76 | 0.79 |

TABLE VII

COMPARATIVE AIR ADSORPTION RESULTS OF CaNaKX2.0

| SAMPLE TYPE | CA CONTENT Equ. % | SAMPLE # | ADSORPTION Temperature | $N_2$ LOADING as 1.55 psia mmol/gm | $N_2$ DELTA LOADING (14.7–1.55) psia mmol/gm | $O_2$ LOADING at 3.7 psia mmol/gm | $N_2$ OPERATIONAL Selectivity |
|---|---|---|---|---|---|---|---|
| CaNaKX2.0HP | 55.00 | 8a | 22° | 0.08 | 0.38 | 0.04 | 9.38 |
| CaNaKX2.0HP | 59.80 | 8b | 22° | 0.9 | 0.42 | | |
| CaNaKX2.0HP | 78.90 | 8c | 40° | 0.11 | 0.45 | 0.04 | 12.00 |
| CaNaKX2.0HP | 78.90 | 8c | 22° | 0.22 | 0.60 | 0.06 | 10.55 |
| CaNaKX2.0HP | 78.90 | 8c | 0° | 0.39 | 0.67 | 0.09 | 7.43 |
| CaNaX2.0 | 76 | 1c | 40° | 0.14 | 0.57 | 0.04 | 12.86 |
| CaNaX2.0 | 85 | 1e | 40° | 0.18 | 0.72 | 0.05 | 13.78 |
| CaNaX2.0 | 90 | 1f | 40° | 0.22 | 0.75 | 0.06 | 12.79 |
| CaNaX2.0 | 97 | 1g | 40° | 0.23 | 0.69 | 0.06 | 12.32 |
| NaX2.0 | 0 | | 22° | 0.05 | 0.36 | 0.03 | 10.85 |
| CaNaX2.0 | 57 | 1a | 21° | 0.13 | 0.55 | 0.05 | 10.74 |
| CaNaX2.0 | 69 | 1b | 21° | 0.17 | 0.63 | 0.05 | 12.07 |
| CaNaX2.0 | 76 | 1c | 20.6° | 0.25 | 0.75 | 0.07 | 11.52 |

Example 8

Samples of higher potassium ion-containing adsorbent were prepared from a sample of zeolite in the form of 1/16 inch diameter pellets having a Si/$Al_2$ molar ratio of 20 and containing about 76 equivalent percent sodium and about 24% equivalent of potassium. The $K^+$ cations were removed to various levels ranging from about 6 to about 11 equivalent percent by the repeated batch ion exchange procedure described hereinabove with calcium chloride solution. Table VI presents the chemical composition of these higher potassium-containing adsorbents. The potassium contents of the samples of Example 8 ranged from 6 to 11 equivalent percent potassium and from 79 to 86 equivalent percent calcium with the remainder being sodium.

Example 9

Adsorption isotherm data for nitrogen and oxygen of activated samples 8a, 8b, and 8c were determined at about 40°, 20°, and 0° as described in Example 4. The results of the air adsorption analyses are shown in Table VII. This data may be compared to the data for equivalent percentages of calcium exchange levels for the X2.0 samples and the equivalent adsorption temperatures shown in Table III. For example, in Table III, sample 1c, containing about 76 equivalent percent calcium had a nitrogen delta loading of 0.14 and a nitrogen selectivity of about 12.86 which may be compared to sample 8c in Table VII which had a nitrogen delta loading of about 0.11 and nitrogen selectivity of about 12.0. These results demonstrated that at levels of potassium up to about 10 equivalent percent, the nitrogen loading and nitrogen selectivity are slightly lower than the equivalent percentage of sodium; but surprisingly, the influence of the potassium ion level on the nitrogen adsorption selectivity of the mixed ion exchanged NaKCa X 2.0 follows the same general adsorption trends as described in Examples 1–7 with respect to sodium ions.

I claim:

1. An adsorbent for use in a cyclic pressure swing adsorption process for the separation of nitrogen from a mixture thereof with oxygen by selective adsorption of nitrogen, which comprises a zeolite X having a framework $SiO_2/Al_2O_3$ molar ratio of from 2.0 to 2.4 and containing from 60 to 89 equivalent percent $Ca^{++}$ cations, from 10 to 40 equivalent percent $Na^+$ cations and from about 0.1 to about 10 percent $K^+$ cations, the total cation equivalency contributed by $Ca^{++}$, $Na^+$ and $K^+$ being at least 90 percent.

2. Adsorbent of claim 1 further characterized in that the zeolite X has a $SiO_2/Al_2O_3$ molar ratio of from 2.0 to 2.35, its cation population comprising from 65 to 80% calcium cations, from 20 to 35% sodium cations, and from about 0.1 to about 1% potassium cations.

* * * * *